Sept. 1, 1953  I. V. BRUMBAUGH  2,650,612
GRADUATED UNIVERSAL VALVE FOR GAS APPLIANCES
Filed Dec. 22, 1948  11 Sheets-Sheet 1
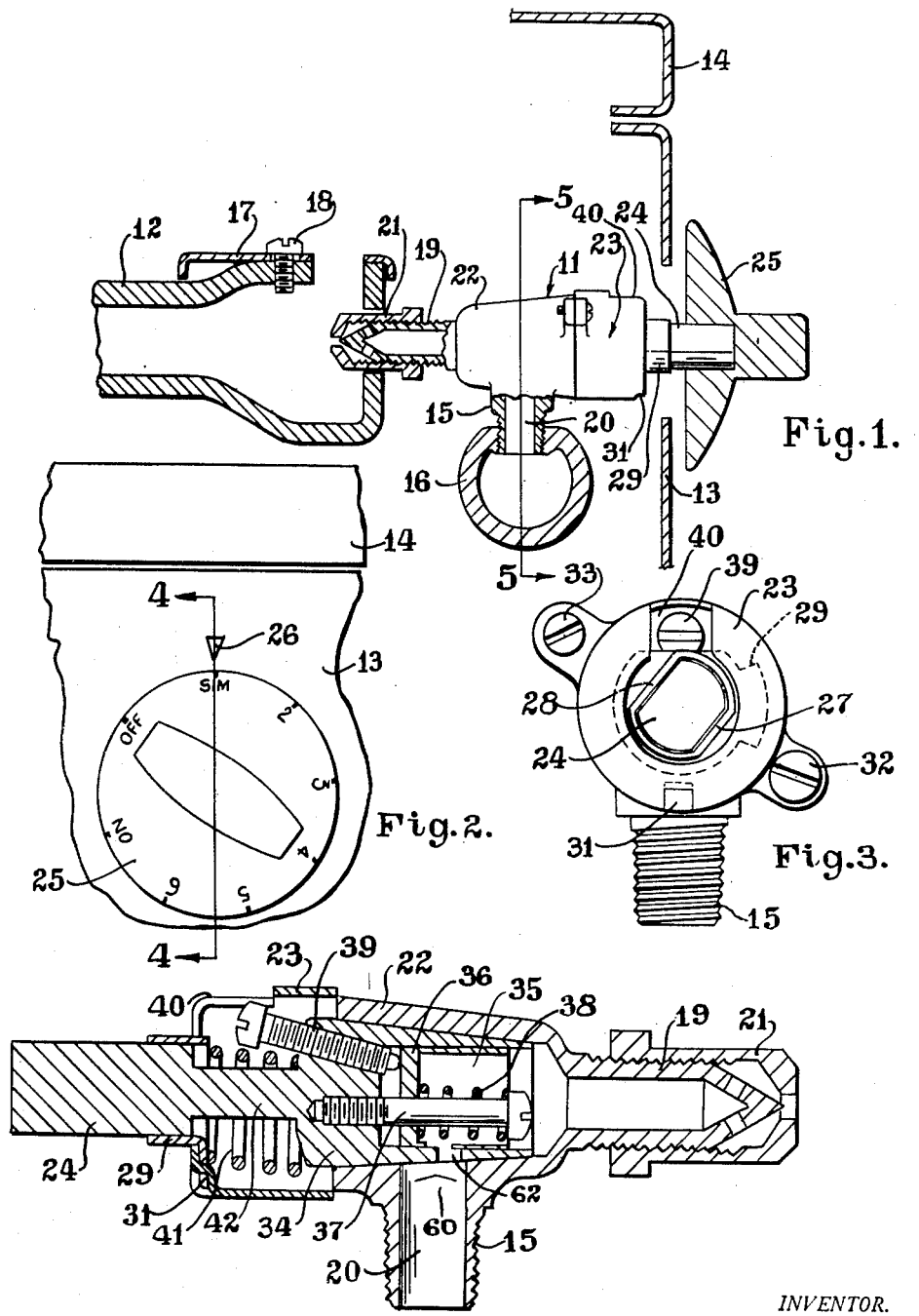
INVENTOR.
ISAAC VERNON BRUMBAUGH
BY
Jerome R. Box
HIS ATTORNEY Sept. 1, 1953  I. V. BRUMBAUGH  2,650,612
GRADUATED UNIVERSAL VALVE FOR GAS APPLIANCES
Filed Dec. 22, 1948  11 Sheets-Sheet 2

INVENTOR.
ISAAC VERNON BRUMBAUGH
BY
Jerome R. Cox
HIS ATTORNEY

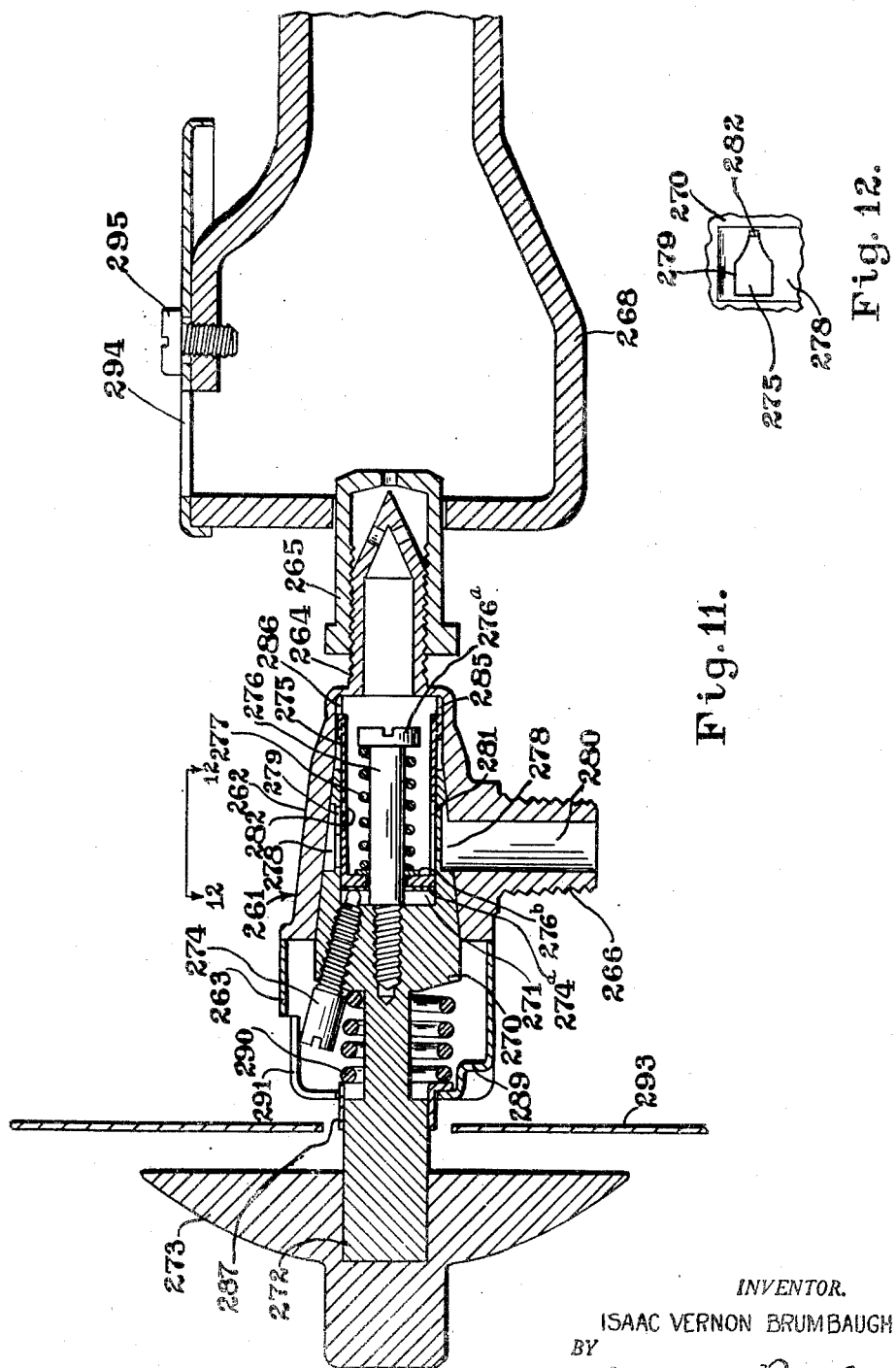

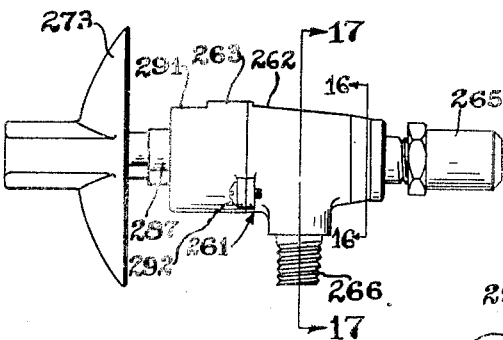
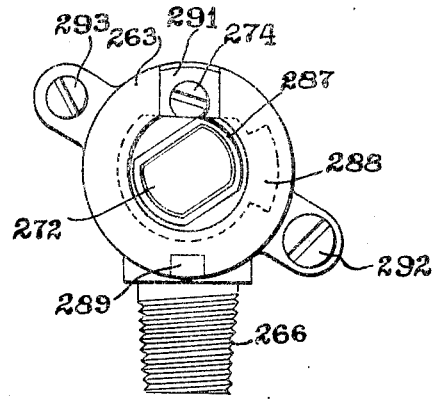
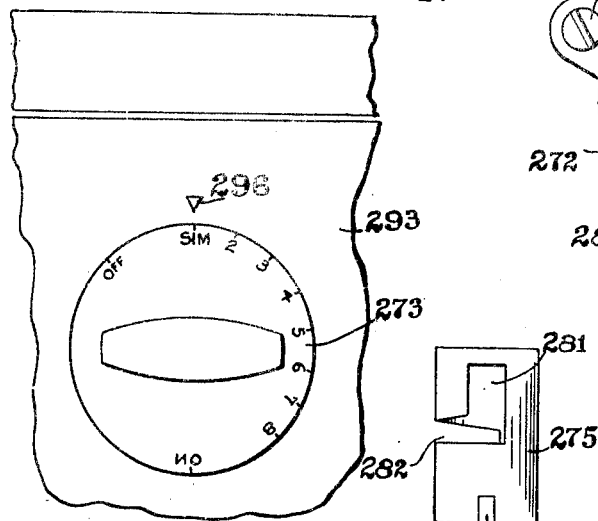
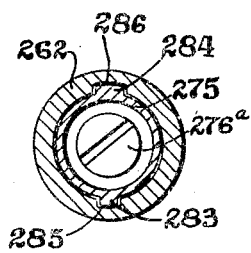
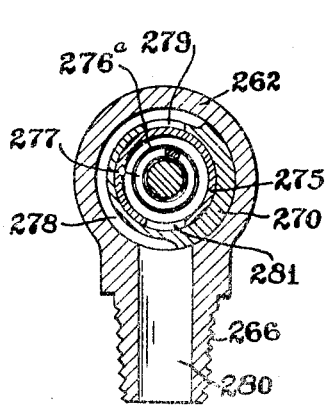

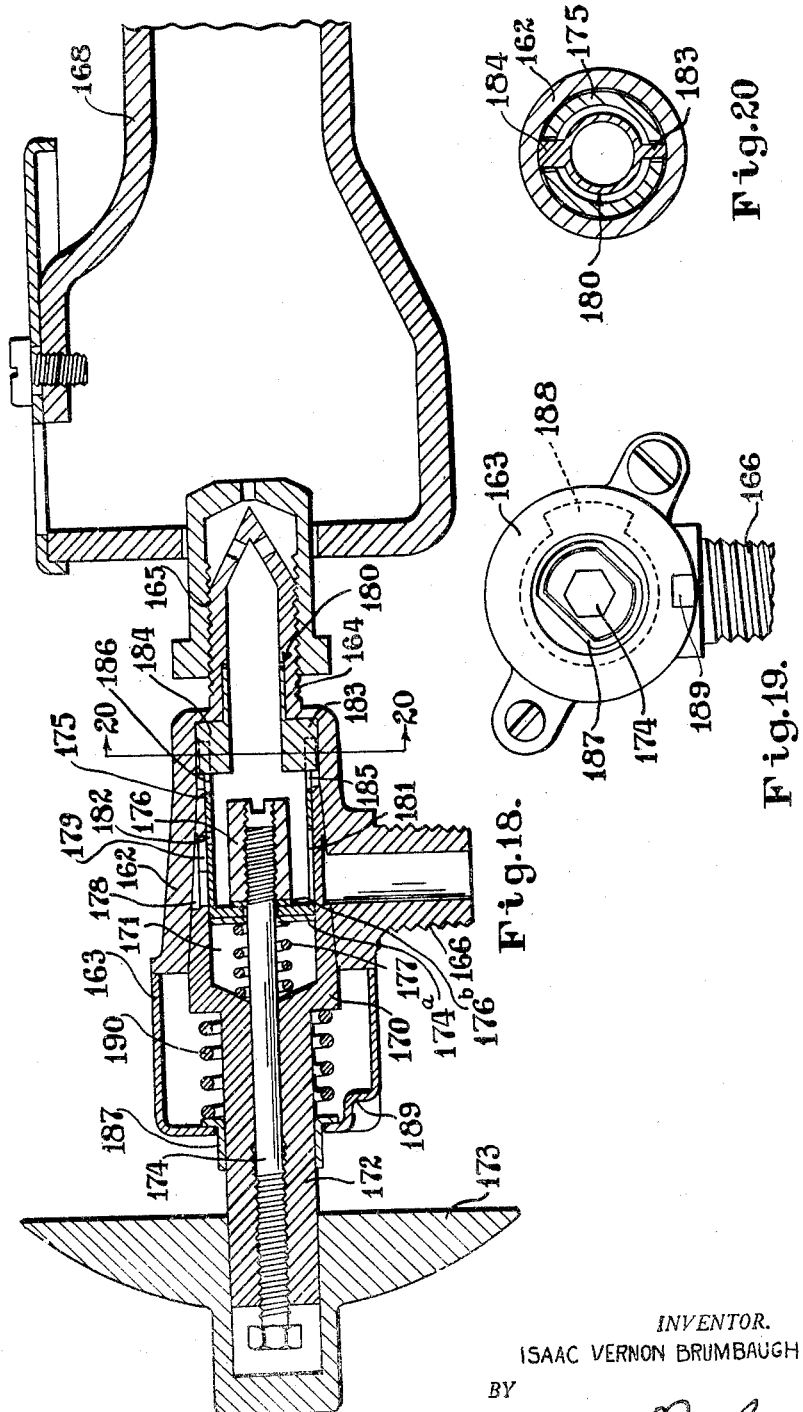

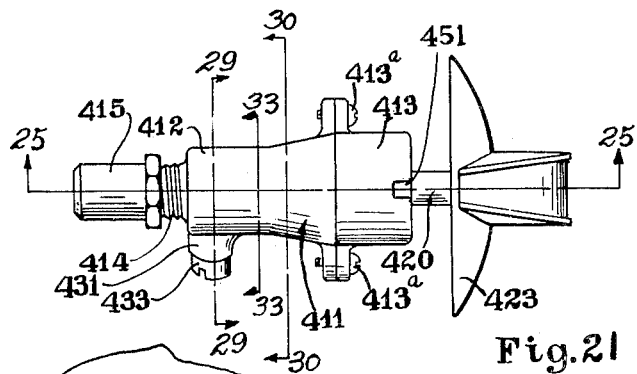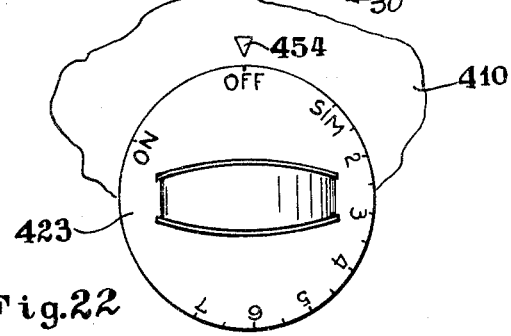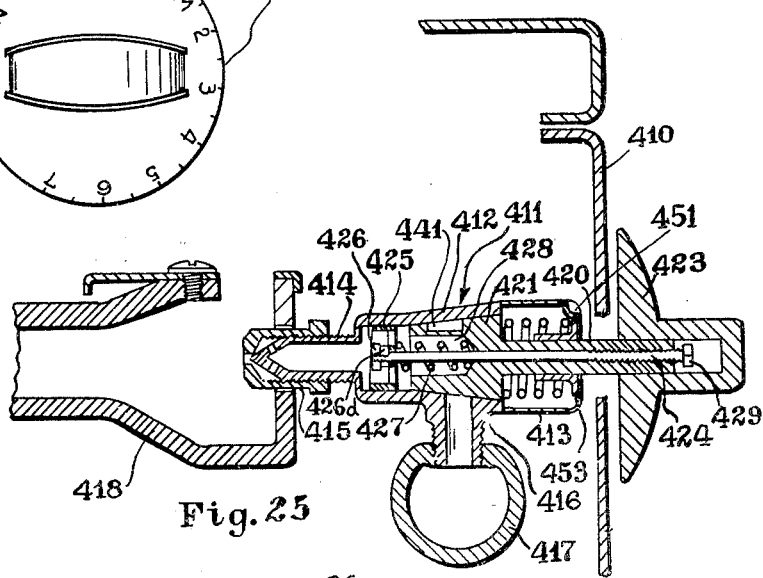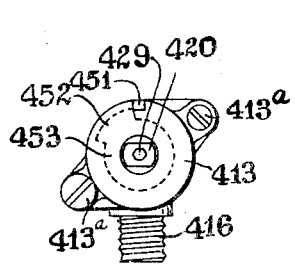

Sept. 1, 1953     I. V. BRUMBAUGH     2,650,612
GRADUATED UNIVERSAL VALVE FOR GAS APPLIANCES Filed Dec. 22, 1948     11 Sheets-Sheet 7

INVENTOR.
ISAAC VERNON BRUMBAUGH
BY
Jerome R. Cox
HIS ATTORNEY

Sept. 1, 1953 I. V. BRUMBAUGH 2,650,612
GRADUATED UNIVERSAL VALVE FOR GAS APPLIANCES
Filed Dec. 22, 1948 11 Sheets-Sheet 8

INVENTOR.
ISAAC V. BRUMBAUGH
BY
Jerome R. Cox
ATTORNEY

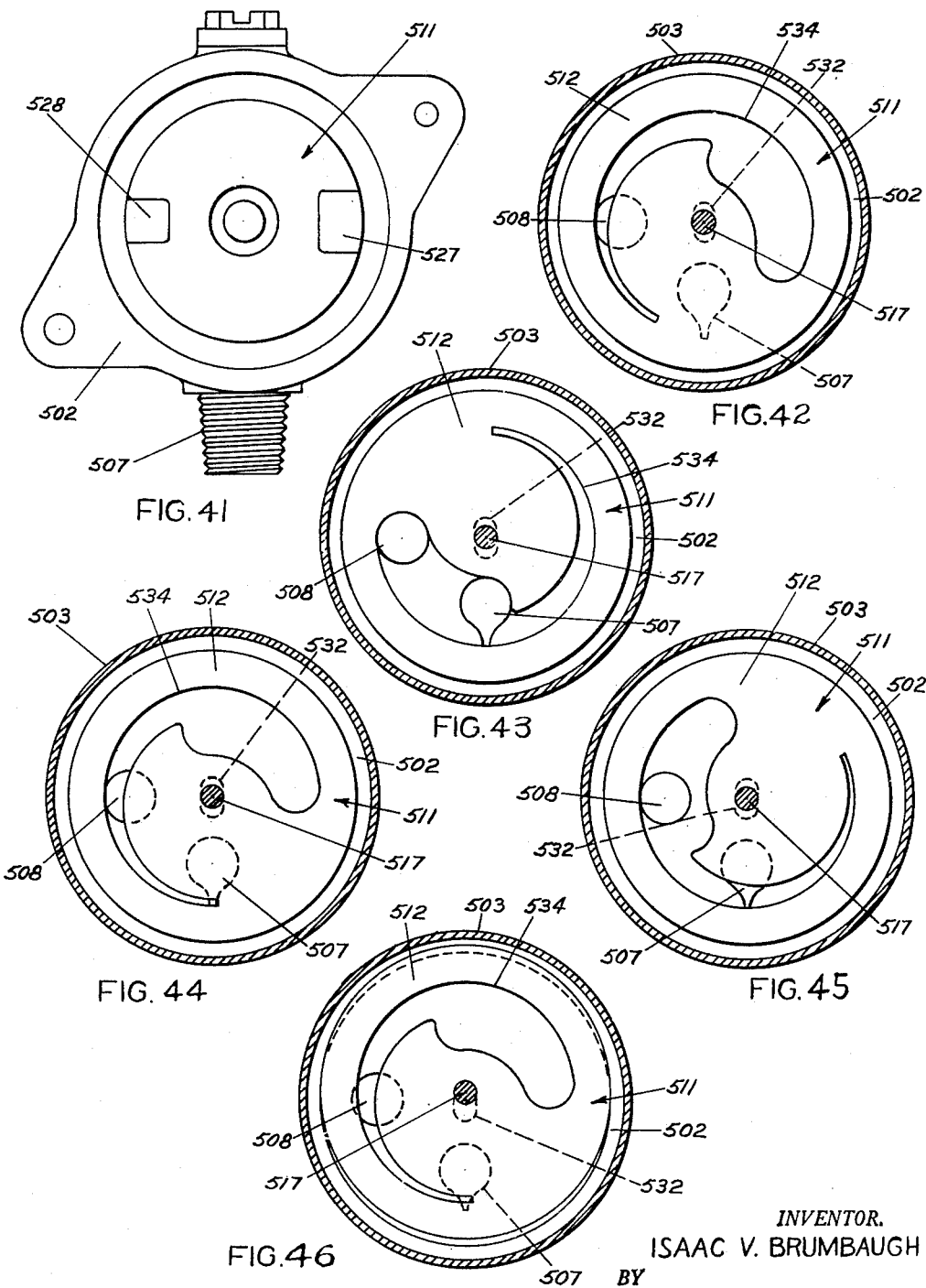

Sept. 1, 1953     I. V. BRUMBAUGH     2,650,612
GRADUATED UNIVERSAL VALVE FOR GAS APPLIANCES
Filed Dec. 22, 1948     11 Sheets-Sheet 10

INVENTOR.
ISAAC V. BRUMBAUGH
BY Jerome R. Cox
His attorney

Sept. 1, 1953      I. V. BRUMBAUGH      2,650,612
GRADUATED UNIVERSAL VALVE FOR GAS APPLIANCES
Filed Dec. 22, 1948      11 Sheets-Sheet 11
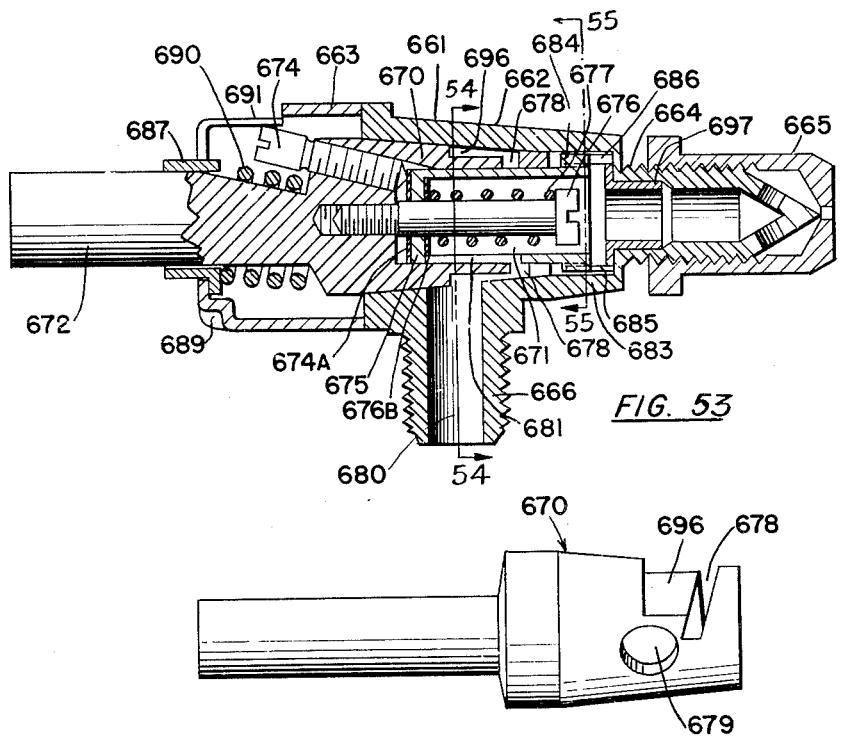
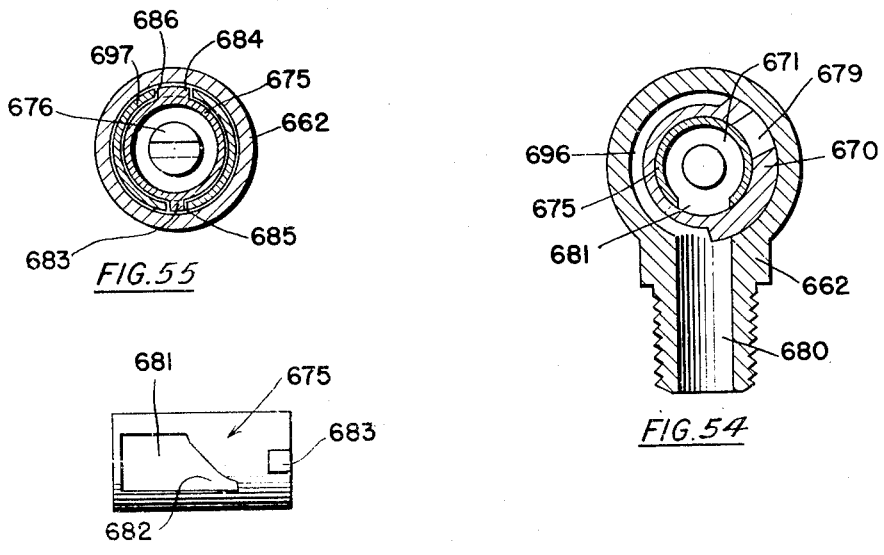
INVENTOR
*ISAAC VERNON BRUMBAUGH*
BY
*Jerome R. Cox*
ATTORNEY Patented Sept. 1, 1953

2,650,612

UNITED STATES PATENT OFFICE 2,650,612

GRADUATED UNIVERSAL VALVE FOR GAS APPLIANCES

Isaac Vernon Brumbaugh, Clayton, Mo.

Application December 22, 1948, Serial No. 66,710

28 Claims. (Cl. 137—637.4)

Nature of invention

The inventions described in this application relate to valves. The valves disclosed and described herein in illustration of my inventions are especially designed for use in controlling the cooking top burners of kitchen ranges, but it is to be understood that the inventions involved clearly have other uses. Thus, the inventions involved may also be useful in the control of gas oven burners. They may be also used for the control of gas outside of the cooking field, such as for example, in the various types of gas heating applicances. They may be even used for the control of other fluids, including liquids as well as gases.

This application is in part a continuation of my co-pending earlier filed applications Serial No. 776,687, filed September 29, 1947; Serial No. 6,719, filed February 6, 1948; and Serial No. 27,167, filed May 15, 1948.

The valves illustrated are designed so that not only may the gas be turned on and off but also the size of the flame may be varied as the valve is rotated from the "on" position to the "off" position or from the "off" position to the "on" position or from the "on" position to the "simmer" position etc. For example, as illustrated in several embodiments, the size of the gas flame may be decreased in a uniform gradual manner from an "on" or maximum flow position down to a condition in which the flame will provide only enough heat to cause the material being cooked to boil gently or simmer and then the supply of gas may be cut off entirely by movement of the valve to the "closed" or "off" position. On the other hand, if desired (as is also illustrated in other figures of the drawing), I may modify the design to provide similar valves in which the valve may be turned from the "off" position directly to the full "on" position and then the flame may be decreased gradually through an infinite number of positions to the "simmer" position. In some of my designs the flow of gas may be increased gradually from a "closed" or "off" position through a minimum lighting position and then gradually increased through an infinite number of positions to a maximum flame or "on" position.

Ordinarily, heretofore, valves for the control of the top burners of a gas cooking range consist of a casing having a single inlet opening and a single outlet opening and a plug having a single passage therethrough positioned within the casing and adapted at times to connect the inlet opening with the outlet opening. Adjustment or "turn down" of the flame is accomplished by partial closing or constriction of the passageway by the process of moving the plug so that the passage through it is displaced slightly out of registration with the ports in the casing. This type of adjustment which is required with such valves makes necessary a very difficult operation by the housewife to get a low or "simmer" flame. That is to say, prior hereto the large majority of gas valves (especially those provided for controlling the cooking top burners of gas ranges) have been produced with a single pair of ports which may be moved into or out of registration in order that the valve may be opened or closed. Thus, in the open position there is substantially a full flow of gas and in the closed position there is no flow of gas. As the ports are moved from exact registration to the closed position there is a decrease in the flow of gas and in the size of the flame produced. However, with such prior art valves inasmuch as the control is not usually accurate or definite, the operator has to be very careful to prevent the turning off of the gas completely or to prevent turning the valve to such a restricted position that the flame is likely to go out. That is, though the size of the flame may be adjusted as the valve is moved toward the closed position, because the cooperating openings through which the gas flows are moved relative to each other to constrict the flow of the gas, yet such adjustment of the flame is very difficult and indefinite.

In order to avoid the difficulties referred to above, some designers have designed valves with a plurality of different size ports through which the gas may flow. The prior art valve of this type, however, has usually been complicated and expensive to manufacture and some are very difficult to control. In all of my valves, the position of the valve which controls the flame desired may be determined by means of numbers indicating the size of the flame. Thus, in my valves as illustrated herein, the various settings of the gas flame are controlled by the use of numbers on the knob of the control valves, so that after the valve is properly adjusted, an operator may set the valve for any desired flame without looking at the flame but merely by the use of the numbers on the knob.

It is true that some valves constructed according to my invention could be operated in a manner similar to the manner in which the prior art single port valves may be operated as described above. For example, when some of my valves are operated so that the ports are brought from exact registration (i. e. the "on" position) to a closed position (i. e. the "off" position) there is a decrease in the size of the flame produced. However, my valves are not intended or expected to be operated like the prior art valves. It is so much more satisfactory to operate my valves in the manner in which they are especially intended, that the operators will never resort to the cumbersome method of operation which is similar to the operation of the prior art valves.

My inventions are especially important when used in connection with gases having high heating values (i. e. high B. t. u. ratings) such as the bottle gases (i. e. the liquefied petroleum gases, such as butane and propane) and also even the natural gases. With such gases it is especially difficult with the single port prior art valves to obtain a simmer flame without inadvertently extinguishing the flame entirely. On the other hand, the prior art valves heretofore referred to, which are formed with a plurality of ports, are also not usually satisfactory with all types of gases because of the difficulties in adjusting them over the wide range of heating values, specific gravities, and distribution pressure of gases used. Usually such valves formed with a plurality of ports like the single port valves are not satisfactory except for one particular kind of gas (i. e. one having a certain B. t. u. value) and then only when the B. t. u. value of gas remains constant. It is, of course, well known that several different kinds of gas having different heating values, specific gravities, and distribution pressures are supplied to users in different parts of the country and sometimes different kinds are supplied to different users in the same community. For instance, a community usually using a natural gas may have a petroleum gas standby reserve. The following table gives the approximate statistics for various types of gas and illustrates the wide differences of these important characteristics thereof:

| Kind of Gas | Heating Value (B. t. u.) | Specific Gravity Air Equals 1.0 | Distribution pressure (inches of water) |
| --- | --- | --- | --- |
| Manufactured | 500–600 | .35–.65 | 3 to 8 |
| Mixed (natural and manufactured) | 800 | .50–.60 | 4 to 8 |
| Natural | 950–1200 | .60–.70 | 3 to 10 |
| Liquefied petroleum propane | 2,500 | 1.5 | 11.0 |
| Liquefied petroleum butane | 3,200 | 1.95 | 11.0 |
| Liquefied petroleum mixed with air | 550–1,700 | 1.15–1.5 | 3 to 10 |

Not only the B. t. u. value of the gas, but also the specific gravity thereof and distribution pressure under which it is supplied, affect the adjustment of the valve. As is clear from the table above all of these may vary widely. Wherever used hereafter in this specification and claims, therefore, I intend the words "heating values" and "heat value" to be construed to mean "heating value, specific gravity of gas and/or distribution pressure thereof."

In some of the valves described and shown in this application in illustration of my invention, I provide a valve having a plurality of different sized ports. In another valve instead of providing a plurality of ports, each controlled by a separate valve member, I provide a valve plug with a tapered port and a cup-like sleeve which has a relative large opening and also a gradually tapering slot. This sleeve and the plug may be rotated relative to each other so that either the relative large opening or portions of the tapered slot will register with the tapered port of the plug valve. Thus, gas may flow through the port in the plug valve and then depending on the setting of the valve either through a selected portion of the tapered slot or through the large opening of the sleeve into the interior of the sleeve and then to the burner. I provide means for rotating the plug so that different portions of the slot of the sleeve register with the port thereof and so that the amount of gas supplied to the burner may be infinitely varied. I also provide means by which the longitudinal position of the sleeve may be varied relative to the plug so that the simmer position flame and other position flames may all be adjusted to compensate for gases of different heating values, specific gravities and distribution pressure. The means for changing the longitudinal position of the sleeve differs in two embodiments of my invention shown. In one case an eccentrically positioned screw extending through the plug operates to push the cup-like sleeve rearwardly against the compression of a spring or to allow it to be moved forwardly by the action of the spring. In the other, a rod threaded concentrically through the plug operates to draw the cup-like sleeve forward of the valve against the tension of a spring or allows the sleeve to be moved rearwardly by action of the spring.

In some of the valves described and shown in this application in illustration of my invention, I provide a plug member with a series of ports formed therethrough which may, if desired, be substantially equal in size as shown and which are associated with a sleeve member which restricts the size of many or most of these ports through a series of graduation so that the effective size of the ports vary substantially infinitely. Moreover, I provide means whereby this sleeve may be moved longitudinally from one position to another so that the effective size of all of the ports may be decreased simultaneusly in order to compensate for the heating value of the gas with which the valve is being operated.

One disadvantage of the prior art valves employing a plurality of ports is that rotation of the valve produces a series of flames of different sizes by distinct steps. In the operation of my valves disclosed herein and referred to above which provide a series of ports, the design is such that I provide many more ports than the prior art valves and thus though the flames actually vary in a series of steps, yet the flames are substantially infinitely variable. In other designs disclosed (such as the valve referred to above which has its sleeve with the tapering port) I may produce an absolutely infinitely variable gradual uniform "turn down" or gradual "turn up" flame, such as is impossible with said prior art valves.

It has been the desire of designers heretofore to provide a body member formed with an inlet port and with an outlet port and having a substantially flat face against which a disc valve member is rotatably positioned for optionally connecting the inlet port to the outlet port or for disconnecting the inlet port from the outlet port as may be desired. However, in such valves of the prior art with which I am acquainted, there is little provision, if any, for a slow, gradual uniform "turn down" or gradual "turn up" of the flame. Such valves operate substantially similarly to the operation of the ordinary single port valve referred to above. Moreover, in such prior art valves there is absolutely no provision for adjusting the valves to compensate for differences in the heating value of the gas supply. The amount of gas flowing through such a valve is the same regardless of B. t. u. rating of the gas, and the openings or equivalent positions remain the same regardless of the heating value of the gas, the specific gravity of the gas and the distribution pressure under which it is supplied.

In one of the valves described and disclosed in this application in illustration of my invention, instead of utilizing a single circular port or a pair of circular ports having a cooperating member movable relative thereto, to connect the ports or to disconnect them, I provide a valve member having an inlet port and having an outlet port of a novel tapered shape, both cooperating with a slot also having a slope, a rotatable member cooperating with the two ports to supply gas at a rate which will give either a full flame, a simmer flame, or any intermediate desired flame or by which the gas may be entirely shut off. In addition to making the disk member rotatable, I also provide means for translating the disc member or moving it bodily relative to the axis of rotation. For example, I may move the disc perpendicularly to the axis of rotation thereof so as to adjust for the different heating value of the gas being supplied. In one of the two embodiments of this type of valve which are shown, the valve is moved from the "off" position to the "simmer" position and through a plurality of intermediate positions to the full "on" position. In another embodiment illustrated, the valve is moved from the "off" position to the full "on" position and then through a plurality of intermediate positions to the "simmer" position.

Objects

One of the objects of my invention therefore is the construction of an improved valve especially useful in connection with gas burners, the valve being simple in operation and economical in construction.

A further object of my invention is the provision of a valve especially useful in connection with gas burners which may be adjusted from a full "on" position through an infinite variation of positions to a "simmer setting" position or alternatively may be moved to an "off" position.

A further object of my invention is the provision in combination with a valve of the character described, of means for adjusting the valve to compensate for the different heating values of the gas for which it is to be used.

A further object of my invention is the provision of a valve of the type described by which there are a relatively large number of definite different size flames selectively possible.

A further object of my invention is to provide an improved valve mechanism having controllable gas control means whereby the valve is adapted to give selectively a relatively large number of types of flames of various sizes and intensity, said valve mechanism being adapted to utilize various types of gas such as natural gas, manufactured gas, mixed gases and liquefied petroleum gas.

A further object of my invention is the provision of a multi-position valve which is very economical to manufacture and which nevertheless has a body and plug of standard relatively small size.

A further object of my invention is the provision of a valve having relatively few parts which are inexpensive to manufacture, easy to assemble and of sturdy design.

A further object of my invention is the provision of a gas cooking top burner valve of simple design, construction and adjustment.

A further object of my invention is the provision of a gas cooking top burner valve having each metering position independently adjustable so that the valve can be adjusted for all types of gas for "simmer," full "on" and various intermediate adjustments.

A further object of my invention is the provision of a gas cooking top burner valve plug having a plurality of passages extending therethrough, one of which is of substantially uniform size and through which the gas passes to the burner when the valve is turned to the full "on" position and another of which is of substantially infinitely variable size and through which the gas passes to the burner for lower flames.

A further object of my invention is the provision, in a valve of the character described, of a port having a variable width which cooperates with an eccentric element passing over the face of the port and adapted to cover a greater or lesser length of the port as may be desired.

A further object of my invention is the provision, in a valve of the character described, of a port having a variable width which cooperates with an eccentric element passing over the face of the port and is adapted to cover a greater or lesser length of the port as may be desired.

Features of my invention in one or more of the various embodiments include the provision, in combination with a valve of the character described, of means for adjusting the valve to compensate for different heating values of the gas with which it is to be used; the provision of a body member formed with an inlet port and an outlet port, having associated therewith a plug formed with a plurality of ports spaced around the circumference thereof, and having a sleeve associated and combined with the plug, said sleeve having a restricting port for each of the ports of the plug and being arranged to be adjusted relative to these ports in order to restrict or increase the size of all the ports simultaneously in order to compensate for the heating value of the gas being used; the provision of a cup-like sleeve which is adjustable, longitudinally of the control plug of the valve in order to adjust for different heating values of the gas being supplied; and the provision of a sleeve and a plug, one of which is formed with a relatively large opening and also with a tapered slot and the other of which is formed with a tapered port which cooperates with the slot to provide an infinite variation of the amount of gas delivered thereby.

Further features include in one or more embodiments, the provision of a body member formed with an inlet port and with an outlet port and having associated therewith a valve disc formed with a tapered opening cooperating with the inlet port and the outlet port; the special shape of the outlet port whereby an infinite variation of the amount of gas supplied may be obtained and whereby an adjustment of the valve for various heating values is possible; the provision of a valve having a body member formed with an inlet port and with an outlet port and having associated therewith a disc member rotatable to effect variations in the amount of gas supplied through the valve together with means for moving the disc member perpendicularly to its axis of rotation in order to adjust the valve for gases of different heating values; the provision in a valve of a tapered port having arcual sides which cooperate with a sleeve or cam having a sloping edge whereby adjustment of the sleeve longitudinally covers and uncovers more or less of the tapered port and whereby rotation of the sleeve also is adapted to cover or uncover more or less of the port; the provision of a gas valve having a rotor plug member for cutting off completely the supply of gas and for turning on the supply of gas, connected to a concentric sleeve which is rotatable for the purpose of increasing or decreasing the size of the passage through which the gas passes through the burner; and the provision of a plug element provided with a passage extending through the hollow center thereof for allowing the passage of a full volume of gas to the burner and also provided with a circumferential groove by which gas may be by-passed around the circumference of the plug to an adjustable port for providing a slow adjustment of the flame.

Further objects and features of my invention will be apparent from the following specification and claims when considered in connection with the accompanying drawings illustrating several preferred embodiments of my invention.

In the drawings:

Fig. 1 is a view in side elevation of a valve constructed according to my invention, the valve being shown associated with the front plate and main panel of cooking top frame of a cooking range and with a mixing tube thereof, portions of the valve, the mixing tube, the plate, the frame, and the gas manifold being shown in section;

Fig. 2 is a view in front elevation of the valve of Fig. 1 showing also a fragment of the range with which it is associated;

Fig. 3 is a view in front elevation of the valve of Figs. 1 and 2, portions of the range and control knob having been removed;

Fig. 4 is a view in vertical section taken substantially on the line 4—4 of Fig. 2;

Fig. 10 is a view in side elevation of another valve constructed according to my invention;

Fig. 11 is a view on an enlarged scale and in vertical section of the valve illustrated in Fig. 10 showing the valve associated with a mixing tube of a gas burner and with the front plate of the gas range;

Fig. 12 is a fragmentary view taken substantially on the line 12—12 of Fig. 11, having portions of the casing broken away and illustrating the cooperation of the tapered port in the plug with the tapered slot in the sleeve;

Fig. 13 is a view in front elevation of the valve of Fig. 10 showing also a fragment of the range;

Fig. 14 is a view in end elevation of the valve of Fig. 10, the control knob having been removed;

Fig. 15 is a view in elevation of the sleeve when removed from the valve;

Fig. 16 is a view in vertical section taken substantially on the line 16—16 of Fig. 10;

Fig. 17 is a view in vertical section taken substantially on the line 17—17 of Fig. 10;

Fig. 18 is a view as if in vertical section corresponding substantially to Fig. 11 but showing a different embodiment of my invention;

Fig. 19 is a view as if in end elevation corresponding substantially to Fig. 14 but showing the end elevation view of the valve of Fig. 18 with the control knob removed;

Fig. 20 is a view in vertical section of the valve of Figs. 18 and 19 taken as if substantially on the line 20—20 of Fig. 18;

Fig. 21 is a top plan view of another valve illustrating my inventions;

Fig. 22 is a view in elevation of the valve of Fig. 21 as it appears looking at it from the front of the range with a fragment of the range panel also shown;

Fig. 23 is a view in elevation looking at the valve in the same direction as in Fig. 22 but having the knob or operating dial removed;

Fig. 24 is a fragmentary view of a portion of the valve as if in side elevation but looking at the valve at an angle of approximately 30° from the horizontal, the plug cap having been removed in order to show the shape of the metering port;

Fig. 25 is a view in vertical section of the valve taken as if on the line 25—25 of Fig. 21, the valve being shown associated with the front plate of a range and with a portion of one of the mixing tubes of one of the top burners of the range and being shown secured to a gas manifold;

Fig. 41 is a view in front elevation of the valve of Figs. 35 to 40 inclusive, shown on an enlarged scale and showing the valve with the cap, stem, stop washer, and spring removed;

Fig. 42 is a view in vertical section taken substantially on the line 42—42 of Fig. 35 showing the valve in the position that the ports occupy when it is set for a gas of medium heating value and is turned to the "off" position;

Fig. 43 is a view similar to that of Fig. 42 but showing the valve in the full "on" position;

Fig. 44 is a view similar to Figs. 42 and 43 but showing the valve in a "simmer set" position;

Fig. 45 is a view similar to Figs. 42, 43 and 44 but showing the valve set in a position intermediate that of full "on" and "simmer" set;

Fig. 46 is a view similar to that of Fig. 44 but showing the valves set in "simmer" position for a gas of relatively low heating value;

Fig. 53 is a view in vertical section showing a different embodiment of my invention;

Fig. 54 is a view in vertical section taken at right angles to the section of Fig. 53 at the line 54—54 thereof;

Fig. 55 is another view in vertical section taken at right angles to the section of Fig. 53 at the line 55—55 thereof;

Fig. 56 is a view in elevation of the plug of the valve of Figs. 53 to 55; and

Fig. 57 is a view in elevation of the sleeve of the valve of Figs. 53 to 56.

Detailed description

Figures 5, 6, 7:
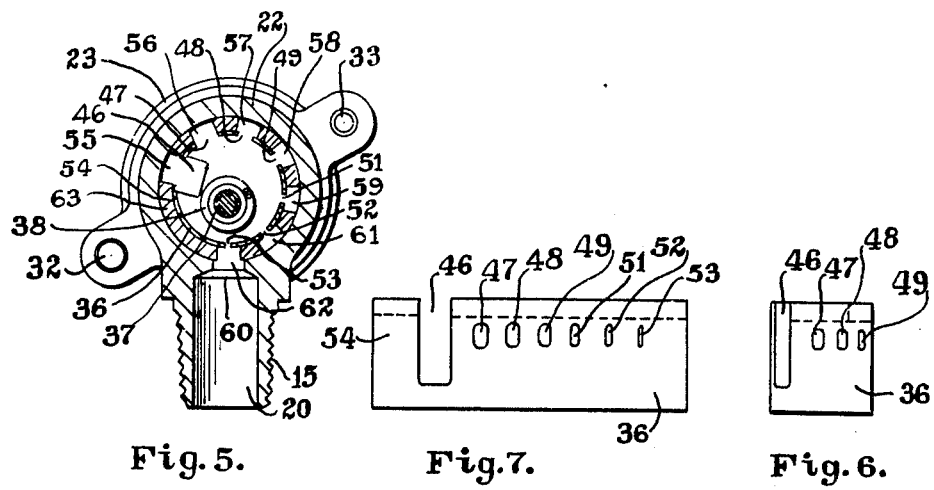
Fig. 5 is a view in vertical section taken substantially on the line 5—5 of Fig. 1.
Fig. 6 is a view of the sleeve in elevation.
Fig. 7 is an expanded view of the sleeve showing the sleeve as it would appear if severed and unrolled.

Referring now to the drawings for a detailed description of the invention it may be seen that I have shown in Fig. 1 a valve 11 associated with a range having a mixing tube 12, a main panel 13, and a cooking top frame 14. The valve 11 has a downwardly extending inlet boss 15 which is screwed into an inlet gas manifold 16. The mixing tube 12 is provided with an air shutter 17 which is held in any desired adjusted position by a screw 18. The inner end of the valve 11 is formed as a threaded projection or nozzle 19 onto which there is screwed an orifice cap 21 which extends into the mixing tube 12. The boss 15 is formed with an inlet bore or passage 20. The valve 11 has a main body member 22 and this is provided with a spring cap 23 forming a casing or cover. Within the body member 22 and the casing 23 is a plug member having a stem 24 which extends forwardly from the valve and on which there is removably secured a knob or dial member 25. As may be seen in Fig. 2 this knob or dial member is formed with markings "Off," "Sim," 2, 3, 4, 5, 6, and "On." These markings cooperate with an indicating mark 26 formed on the panel 13 to indicate the position of the valve and indicate the amount of gas which may flow through the valve at the corresponding setting thereof.

As may be seen more clearly in Fig. 3, the stem 24 is formed with a relatively short flat surface 27 and a relatively large flat surface 28 by reason whereof the position of the knob 25 on the stem 24 is accurately determined. Associated with the stem 24 is a stop sleeve 29 which as shown in Figs. 1 and 3 surrounds a portion of the stem 24. It is to be understood that this stop sleeve cooperates with a stop 31 formed as an indentation in the casing member 23 and so limits the movement of the dial 25. Thus, the stem 24 and its associated plug may not be turned beyond the "off" position in one direction (clockwise in Fig. 3) and the full "on" position in the other direction (counter-clockwise in Fig. 3). As may also be seen in Figs. 1 and 3 the casing or spring cap 23 is secured to the main body member 22 by means of a relatively large screw 32 and a relatively small screw 33 which pass through corresponding pairs of ears formed on the body member 22 and the casing 23.

Referring now especially to Fig. 4 it may be seen that the stem 24 is a part of a plug member 34. The plug member 34 is hollow as at 35 and houses within said hollow a sleeve member 36. This sleeve member is important in connection with this embodiment of my invention and will be described more completely later. This sleeve member 36 is resiliently held in position by an off center screw 37 threaded into the plug 34 and extending through an off center opening in the sleeve 36. A spring 38 bears at one end on the base of the sleeve 36 and at its opposite end on the head of the screw 37. Bearing also on the base of the sleeve 36 but on the opposite side from the spring 38 is an obliquely extending adjustment screw 39, the head of which may be seen in Fig. 3. It will be noted that this adjustment screw is wholly within the spring cap 23. As will be more fully described later the adjustment screw 39 acting on the sleeve 36 positions the sleeve 36 as may be desired, it being understood that the spring 38 maintains the sleeve 36 always in contact with the screw 39. It will also be noted that in the "simmer" position, access to the screw 39 is possible through a notch 40. Positioned between the stop sleeve 29 and the main body of the plug 34 is a spring 41. The spring 41 surrounds a reduced portion 42 of the plug 34 and maintains the stop sleeve 29 and the plug 34 in correct position.

Referring now to Figs. 5, 6, and 7 for a more specific description of the sleeve 36 it may be seen that the sleeve is formed with a relatively large notch, slot or port 46 formed in both the base and side of the sleeve. This large notch 46 is provided to allow a full flow of gas at the "on" position. The sleeve is also formed with a plurality of oblong slots of varying widths such as 47, 48, 49, 51, 52, and 53. These slots vary in width from the relatively narrow slot 53 to the relatively wide slot 47. They are oblong with parallel sides and the end which cooperates with the associated round part in the plug is arcual. The opposite end may also be arcual, although this is not material. By this construction a finer and more accurate adjustment with gases of high heating value is possible. The sleeve is also formed with an imperforate portion 54.

As appears most clearly in Fig. 5, the plug 34 is formed with a series of ports 55, 56, 57, 58, 59, 61 and 62 which correspond in position with the ports 46, 47, 48, 49, 51, 52, and 53. However, all of the plug ports 56, 57, 58, 59, 61 and 62 are round and of substantially equal size. They could be drilled simultaneously or consecutively on the same center line and in the same plane. The port 55 is oblong in shape. The plug also has an imperforate portion 63 corresponding to sleeve portion 54.

*Operation*

It is believed that the operation of the valve described above will be fairly obvious from the description. With the valve in the position shown in Figs. 2, 3, 4, and 5, gas may flow from the manifold 16 through the inlet passage 20 through the plug port 62, and the sleeve simmer port 53 into the interior of the sleeve and thence through the nozzle 19, the orifice cap 21 into the mixing tube 12 and thence to the burner to maintain a flame which will give enough heat to boil gently or to simmer material placed thereon. If the valve is turned in a clockwise direction (as shown in Fig. 2 or 3) or in a counter-clockwise direction (as shown in Fig. 5) until the stop sleeve 29 contacts with the stop 31 and the indication "off" registers with the arrow 26, the imperforate portions 54 and 63 will cover the inlet port opening from the inlet passage 20 so that no gas may flow from the gas manifold 16 to the mixing tube 12. If on the contrary the valve is turned in a counter-clockwise direction as shown in Figs. 2 and 3 (clockwise as shown in Fig. 5) the sleeve ports 52, or 51, 49, 48, 47, and 46 may be caused successively to register with the inlet port connected with the inlet passage 20 so that successively larger amounts of gas may flow to maintain successively larger flames. Thus the user may secure a flame of any intensity desired by the user. If the valve is turned as far as possible in a counter-clockwise direction as is shown in Figs. 2 and 3 (clockwise direction as shown in Fig. 5) substantially a full flow of gas will be allowed through the inlet passage 20, the ports 46 and 55, the interior of the sleeve 36, the nozzle 19, the orifice cap 21, and the mixing tube 12 to the burner.

The valve may be adjusted for gases of various heating values. For the purpose of adjusting the valve to the desired settings, the valve is first turned to the full "on" position and the orifice cap 21 and the air shutter 17 are adjusted to give the proper flow of gas and the proper air adjustment, respectively. The proper flame characteristic is determined by adjustment of the air shutter. Then the valve is turned back to the "simmer" position and the screw 39 is adjusted to move the sleeve inward or outward until the flame is the minimum that will be maintained without danger of going out.

It should be here noted again that access to the screw 39 is only possible when the plug of the valve is set in the "simmer" position. Thus the positioning of the valve for the "simmer" position is in a sense automatic. That is to say, it is impossible to try to adjust the flame to a "simmer setting" except when the plug is positioned at the "simmer" position. The intermediate positions are automatically adjusted for the "heating value" of the gas by the single adjustment at the "simmer" position.

It will be understood that more or less of the area of the oblong sleeve ports, 47, 48, etc., is uncovered depending on the heating value of the gas being used. When adjusted for use with the liquefied petroleum gases only about 10% of their area is utilized. The natural gases require a setting where the oblong ports are much further uncovered. The mixed gases require still larger openings. The manufactured gases (especially if the prevailing gas pressure is low) may require a setting wherein the oblong sleeve ports are near the fully uncovered position. It may also be noted that the screw 39 and notch 40 might, if desired, be positioned at other places on the circumference of the valve rather than the top. I prefer the position as shown, however. If moved they must both be moved together, the screw 37 must not interfere and the inner end of the screw 39 must be positioned so that it may not enter the notch 46.

It is to be understood that a portion of the edge of the oblong ports 47 to 53 inclusive overlaps a portion of the edge of the associated round ports 56 to 62 inclusive. The amount of the overlap depends on the adjustment of the sleeve 36 by the screw 39. The edges which overlap may be called the adjustment edges. I wish to point out here that lines drawn to contact the adjustment edges of ports 47 to 53 and 56 to 62 should preferably be parallel. Because of the oval shape of the port 60, it is not so important that these lines be parallel to circumferences of the plug, but it is important that they be parallel to each other in order that movement of the sleeve 36 by the screw 39 shall adjust each of the ports proportionally.

*Modified embodiment*

Figure 8:
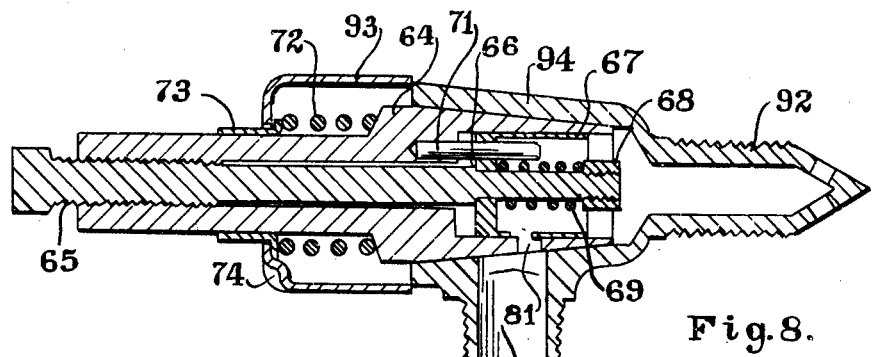
Fig. 8 is a vertical sectional view similar to Fig. 4 showing an alternative form of the valve.
Figure 9:
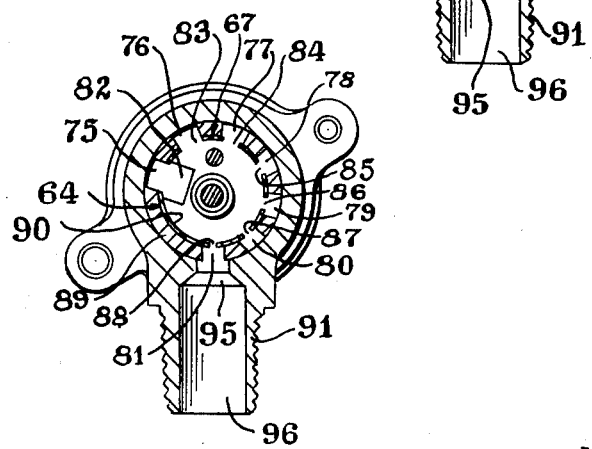
Fig. 9 is a view similar to Fig. 5 showing another vertical sectional view of the valve of Fig. 8.

In the embodiment shown in Figs. 8 and 9 the main body 94 is provided with a nozzle 92 and with a spring cap casing 93. The plug 64 is formed with a longitudinal axial bore through which the relatively long screw 65 extends. This screw 65 is formed with a shoulder at 66 against which the base of the sleeve 67 bears. At its rearward end the screw 65 is provided with a nut 68 which bears against a spring 69 interposed between the nut 68 and the base of the sleeve 67. A guide pin 71 secured in the plug 64 extends through a hole formed in the sleeve 67 and causes the sleeve to rotate coincidentally with the plug 64. A spring 72 is interposed between the plug 64 and a stop sleeve 73 which cooperates with a stop indentation 74. The plug 64 is formed with an oblong port 75 and with round ports 76 to 81 inclusive and the sleeve is formed with varying width slit-like ports 83 to 88 inclusive and with a notch or large slot 82. The plug is formed with an imperforate portion 89 and the sleeve with a corresponding imperforate portion 90. The main body is formed with a threaded boss 91 adapted to be threaded into the gas intake manifold.

Operation

The operation of this embodiment is similar to that of the embodiment previously described. Adjustment of the "simmer setting" is accomplished by turning the valve to the "simmer" position, removal of the knob or dial member and adjustment of the screw 65. It is not necessary to hold the stem of the plug when adjustment of screw 39 is being made. It is best, however, to hold the stem of the plug when making a "simmer" adjustment by means of screw 65 (Fig. 8).

Features of my invention not previously sufficiently emphasized are the shape of the neck 60 of the inlet port 20 and the shape of the neck of inlet port 96. As may be seen by comparison of Figs. 4 and 5 and by comparison of Figs. 8 and 9, the necks or ports 60 and 95 are oblong with the greater length extending longitudinally of the valve. As stated above, the port 55 is oblong in shape and ports 56, 57, 58, 59, 61 and 62 are round in shape. The port 55 corresponds substantially in size with the size of the neck or port 60. Similarly (as stated above) the port 75 is oblong in shape and ports 76 to 81 inclusive are round in shape, the port 75 corresponding substantially in size with the neck or port 95. These features make it possible to obtain a relatively large number of ports (or valve positions) with a plug and valve body of regular size.

Modified embodiments

Referring still to the drawings for the detailed description of another embodiment of my invention and especially to Figs. 10 to 17 inclusive, it may be seen that I have shown a gas cock 261 having a main casing 262 and a supplementary cover 263. Formed on the rearward end of the casing 262 is a threaded projection or nozzle 264 onto which there may be screwed (as is shown in Fig. 11) an orifice cap 265. The casing 262 is also formed with a downwardly extending threaded boss 266 which is adapted to be threaded into a gas manifold. The orifice cap 265 is adapted to be extended into the end of a mixing tube 268 (Fig. 11). Positioned in the casing 262 is a tapered valve plug 270 having a central recess 271 formed in the rear end thereof and having a forwardly extending stem 272 onto which there is secured a knob or operating dial 273. The valve plug 270 is formed with an oblique threaded bore inclined to the axis of the plug. Threaded into this inclined bore is an adjustment screw 274 bearing at its rearward end on a washer 274a which in turn bears on a sleeve 275 which is positioned in the recess 271. The sleeve 275 surrounds a spring retaining screw 276 which is screwed concentrically into a central bore formed in the plug 270. Surrounding the screw 276 is a spring 277 which bears at its rearward end on the head 276a of the screw 276 and at its forward end on a washer 276b fitted against the inner side of the base of the cup-like sleeve 275. Thus, the sleeve 275 is resiliently held by the spring 277 against washer 274a bearing against the inner end of the screw 274 and thus, by means of the screw 274, the position of the sleeve 275 may be adjusted longitudinally of the plug 270. The washers 274a and 276b preferably are hardened. They as well as the sleeve 275 should be thoroughly and efficiently lubricated.

Referring for the instant to Fig. 17 it may be seen that the plug 270 is formed with a groove 278 which extends more than half-way around the circumference of the plug. It is also formed (see Fig. 12) with a tapered port or opening 279 by which gas flowing through the groove 278 may pass into contact with the exterior of the sleeve 275. The sleeve 275 is formed with both a relatively large opening 281 and with a tapered slot 282. The threaded projection 266 is formed with an inlet bore 280. Thus (assuming that the plug 270 has been turned to such a position that a portion of the groove 278 registers with the inlet bore 280) it is obvious that the size of the opening through which gas may flow from the groove 278 into the interior of the sleeve is determined by the relative position of the sleeve 275 to the plug 270. As stated previously the plug 270 may be rotated by means of the knob 273. As an alternative, if desired, the opening 281 and the tapered slot 282 might be formed in the plug 270 while the tapered port 279 might be formed in the sleeve 275. Such a construction is shown in Figs. 53 to 57 inclusive.

Means are provided to hold the sleeve 275 against rotation. Referring especially to Figs. 11 and 16 it may be seen that the sleeve 275 is formed with a relatively small projection 283 and with a relatively large projection 284 which fit in corresponding grooves or slots 285 and 286 which are formed in the interior surface of the casing 262.

Within the cover 263 there is provided a stop sleeve 287 having a stop 288 (Fig. 14) which cooperates with a stop 289 formed on the cover 263 to prevent turning the operating dial 273 clockwise farther than the "off" position or counter-clockwise farther than the "on" position. A spring 290 bearing at its forward end on the sleeve 287 maintains the plug 270 in the casing 262. The casing 263 is also formed with a cut-out portion or or opening 291 through which access may be obtained for the purpose of adjusting the screw 274 as desired. It is to be noted in this connection that the opening 291 is arranged in such position that the screw is in position for adjustment through the slot 291 when and only when the plug 270 and the sleeve 275 cooperate to allow a minimum flow of gas (i. e. the "simmer set" position).

Relatively large screw 292 and relatively small screw 293 are provided to hold the cover 263 to the main casing 262; the screws being of different size so that improper assembly is impossible.

As shown in Fig. 11 the valve may be assembled, if desired, with a range having a front plate 293. Primary air adjustment in the mixing tube 268 may be obtained by the adjustment of a plate 294 adjustably secured to the mixing tube 268 by means of a screw 295.

In Figs. 18, 19 and 20 another valve illustrating my invention is shown. Therein, the casing 162 is joined to the cover 163 and has a tapered bore into which the tapered plug 170 extends. It is provided with an inlet boss 166. The nozzle 164 is provided with an orifice cap 165 which extends into a mixing tube 168. In the central recess 171 is a sleeve 175. Onto the forwardly extending stem 172 is an operating knob 173. Threaded concentrically through the stem 172 and through the sleeve 175 is an adjusting screw 174, on the rear end of which is a nut 176 which bears on a hardened washer 176b in turn bearing on the base of the sleeve 175. Surrounding the screw 174 within the recess 171 is a spring 177 which bears on a hardened washer 174a, and maintains the sleeve 175 in contact with the washer 176b in turn bearing on the nut 176. A spring 190 bears on the plug 170 and on the stop sleeve 187. The projection 188 on the stop sleeve 187 cooperates with stop 189 to limit rotation of the plug. A tubular member 180 with a pair of keys 183 and 184 is press-fitted into nozzle 164 so that the keys 183 and 184 fit into slots 185 and 186 formed in the end of the sleeve 175 and prevent rotation of the sleeve 175. Because of the difference in the size of the keys 183 and 184 they also prevent improper assembly.

Otherwise the sleeve 175 is like the sleeve 275, being formed with a large slot 181 and a tapered slot 182 which both cooperate with the tapered port 179 and the groove 178 formed in the plug 170.

Operation

The operation of the valves shown in Figs. 10 to 20 inclusive and described above is as follows:

The valve 261 is installed with a range as shown in Fig. 11. The knob 273 is turned to the full "on" position. The orifice cap 265 is adjusted on the nozzle extension 264 to allow the passage of the proper amount of gas for the type of burner used (about 9000 B. t. u. per hour for a regular burner and 12,000 B. t. u. per hour for a giant burner). Then the air shutter 294 is adjusted on the mixing tube 268 to obtain the proper type of flame for most efficient operation. The knob 273 is then turned so that the indication "sim" (i. e. "simmer") is brought into registration with the pointer 296 (i. e. the position illustrated). This brings the screw 274 into registration with the cut-out portion 291. The knob is removed and the screw 274 is then adjusted to move the sleeve 275 longitudinally and to secure a correct "simmer" flame (i. e. about 1,500 B. t. u. per hour for a regular burner and about 2,000 B. t. u. per hour for a giant burner). This completes the correct adjustments for both the full "on" position and the "simmer" position. The intermediate positions were thus automatically adjusted. It will be noted that an infinitely variable flame of any desired size may be obtained between "on" and "sim," it not being necessary to move to the exact positions 2, 3, 4, 5, 6, 7 and 8. These indications are helpful in adjusting the flame for cooking but obviously any desired number of intermediate positions could be indicated. Even if no intermediate numbered positions were indicated, the operation of the burner would be the same. For cooking operations, the valve may be turned from the "off" position to any desired position. It is to be especially noted that rotation of the knob 273 turns the plug 270 but does not turn the sleeve 275 which is held against rotation by the projections 283 and 284. When the valve is in the "off" position (i. e. about 45° clockwise from the position shown in Figs. 13 and 17) the groove 278 does not register with the bore 280. Thus no gas may flow from the bore 280 (which is connected with the inlet gas manifold) into the valve. If the valve plug is turned counter-clockwise to the "on" position, a full flow of gas flows from the manifold through the bore 280, the registering port 279 and large opening 281 into the interior of the sleeve 275 and thence through the nozzle 264, the orifice cap 265, the mixing tube 268 and to the burner. In this open position of the valve, the gas is automatically lighted, where flash tube lighting is provided, or it may be lighted in any other convenient manner. The valve may be left in such position to secure a maximum flame or may then be turned clockwise to the "simmer" ("sim") position or to any intermediate position to secure any other desired flame. It should be noted that the size of the flame is infinitely variable between the "simmer" flame and the full flame. As the flame is turned down the supply of gas is restricted not only by the continuously smaller width of the slot 282 but also by the continuously smaller width (lengthwise of the slot 282) of the tapered portion of the port 279 (see Fig. 12).

In the valve shown in Figs. 18 to 20, the operation is the same except as follows: The position of sleeve 175 longitudinally of the plug 170 is adjusted (after the knob 173 is brought to the "simmer" position and removed) by rotation of the screw 174 during which operation and at all other times the sleeve 175 is held against rotation by the keys 183 and 184.

Modified embodiment

Referring now especially to Figs. 21 and 25 it may be seen that I have illustrated a gas cock valve 411 associated with the front plate 410 of a cooking range. The valve has a main casing 412 and a supplementary cover 413 which is secured to casing 412 by screw 413a. Formed on the rearward end of the casing 412 is a threaded projection 414 onto which there is screwed an orifice cap 415. The casing 412 is also formed with a downwardly extending threaded boss 416 which is adapted to be threaded into a gas manifold 417. The orifice cap 415 is adapted to be extended into the end of a mixing tube 418. Positioned in the casing 412 is a valve plug 421 having a forwardly extending stem 420 onto which there is secured a knob or operating dial 423. The valve plug 421 is axially bored and has extending through this axial bore an adjustment rod 424 which has connected to it at its rearward end a sleeve or piston 425. The sleeve or piston 425 is actually slidably mounted on the rearward end of the rod 424 and bears on one or more nuts 426 and 426a screwed onto the end of the rod 424. It is maintained resiliently in contact with the nuts 426, by a spring 427. The spring 427 seats at its front end in a pocket 428 formed in the valve plug 421. The rod 424 is adjustably threaded in the axial bore of the plug 421 and has on its forward end a head 429 by which it may be screwed into or out of said bore so as to adjust the position of the sleeve 425 relative to the valve plug 421.

Figure 26:
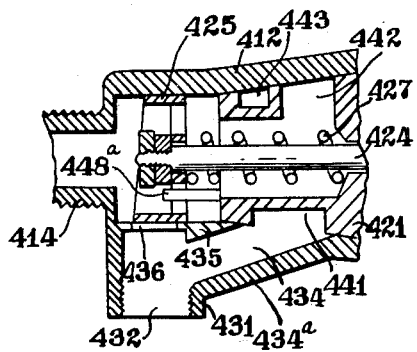
Fig. 26 is a fragmentary view in section taken on a plane substantially 30° from the horizontal (i. e. along line 26—26 of Fig. 24) and shown on a larger scale than Fig. 25 and showing the position of the valve parts when the valve is set for a minimum flame (i. e. the "simmer" position) when adjusted for a gas having a high heating value.

Inasmuch as the sleeve 425 performs an important function in connection with my invention, its construction should be especially noted and it should be noted that the rearward end thereof is cut on a bias or sloped so that one portion of the circumference extends farther inward or rearward within the casing 412 than do other portions thereof. This bias cut sleeve 425 cooperates with a tapered opening 436 which may best be explained by reference to Fig. 24. By reference thereto it is to be noted that sides of the opening 436 are formed as arcs rather than as straight lines. Referring also to Fig. 26 it may be seen that the casing 412 is formed with a tubular projection 431 having an opening 432 which is normally closed during operation by a plug cap 433 (Fig. 21). As will be subsequently explained, the interior of the projection 431 is at times connected with a source of supply of gas as by a passage 434 formed in a sloping projection 434a. A partition 435 formed within the casing 412 (see Figs. 24 and 26) is formed with the tapered arcual opening 436 through which gas at times flows to the burner 418. The sleeve 425 cooperates with this tapered arcual opening 436 and depending on the longitudinal and rotative position of the sleeve 425 uncovers more or less of the opening so that the amount of gas which flows through the opening may be accurately adjusted and regulated.

Figures 31, 32:
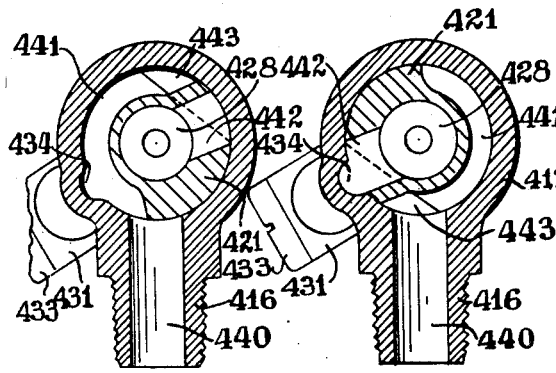
Fig. 31 is a view in vertical section taken substantially on the line 30—30 of Fig. 21 but showing the valve parts in the position of the plug when the piston is at the "simmer setting" position according to the knob or operating dial.
Fig. 32 is a view of vertical section taken substantially on the line 30—30 of Fig. 21 showing the position of the valve parts when the valve is turned to a position approaching the "on" position.

The manner in which the gas may flow from the manifold 417 through the valve to the tube 418 when it is desired to have a flame at the burner and by which the flow of gas may be cut off when desired should now be explained. The valve plug 421 is formed with the pocket 428. It is also, in the plane of the line 30—30 formed with a circumferential groove 441 and with a radial bore 442 leading from the circumference of the plug to the pocket 428. It is also formed (as is shown partly in dotted lines in Figs. 30 to 32 inclusive but as is shown most clearly in Fig. 33) in the plane of the line 33—33 with a groove 443 arranged at times to connect the groove 441 with the bore 442. When the valve is in the position of Fig. 30, no gas may flow from the passageway 440 in the boss 416 either into the pocket 428 or into the grooves 441 or 443 and thus there can be no flame. When, however, the valve is turned to the position of Fig. 31 gas may flow through the groove 441, the passage 434 and the port 436 to the interior of the projection 414 and thence to the tube 418. So also as rotation is continued until the position of Fig. 32 is approached. When the position of Fig. 32 is reached, gas may not flow through groove 441 directly to passage 434, but may flow through groove 441 and groove 443 not only to passage 434 but also to bore 442. From bore 442 it flows in full stream into pocket 428 and thence to the interior of projection 414. Continued counter-clockwise rotation from the position of Fig. 32 connects the passageway 440 in the boss 416 directly with the bore 442.

Figures 28, 29, 30:
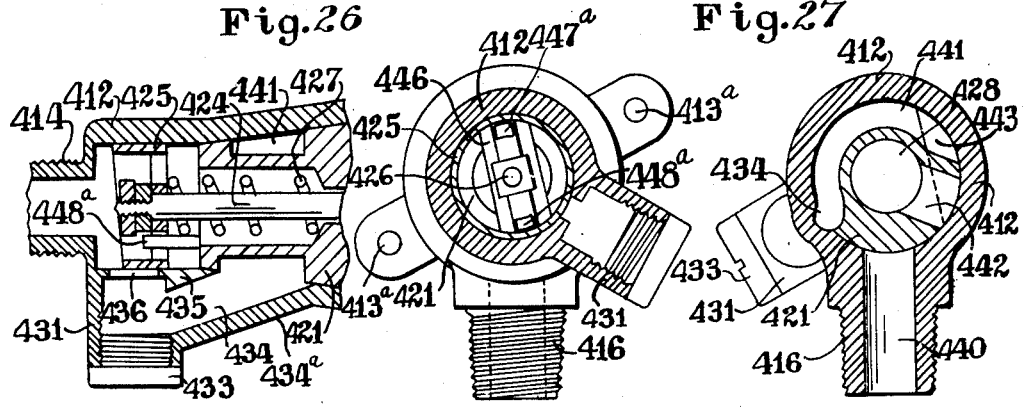
Fig. 28 is a view similar to Figs. 26 and 27 but showing the position of the valve ports when the valve is adjusted for a gas having a high heating value, and is turned slightly beyond the "7" position of the valve, thus giving a relatively high flame without being at the full "on" position.
Fig. 29 is a view in vertical section of the valve taken substantially on the line 29—29 of Fig. 21.
Fig. 30 is a view in vertical section taken substantially on the line 30—30 of Fig. 21 and showing the valve ports in the position which they occupy when the valve is in the "off" position.
Figure 34:
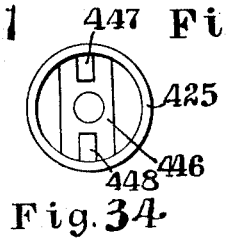
Fig. 34 is a view in end elevation of the sleeve or piston which cooperates with a tapered port to regulate the variable flow of gas in the operation of the valve shown in Figs. 21-33, inclusive.

Referring now to Fig. 29 and Fig. 34 it may be seen that the sleeve 425 has secured thereto or formed therewith an eccentrically position H-shaped supporting member 446 having slots 447 and 448 through which extend (Fig. 29) fingers 447a and 448a formed as extensions of the valve plug 421. Thus rotation of the valve plug 421 (by means of the fingers 447a and 448a and the H-shaped member 446) rotates the sleeve 425 to effect adjustment of effective size the triangular appearing metering port 436 as the valve is turned and as the sloping face of the sleeve 425 moves over the port.

The knob 423 is (as may be seen by referring to Fig. 22) provided with markings to indicate the "off" position of the valve, the "on" position of the valve, the "simmer" position thereof, and graduated positions to indicate intermediate higher flames in the order of the numbers as sown. A pointer 454 on the plate 410 cooperates therewith.

Operation

Figure 27:
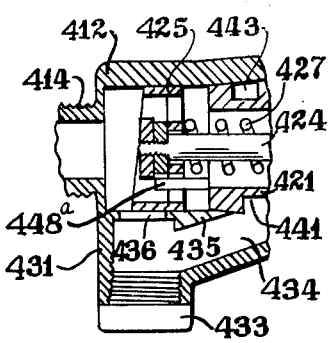
Fig. 27 is a view similar to Fig. 26 but showing the approximate "simmer" position of the valve when it is adjusted for a gas having a lower heating value.
Figure 33:
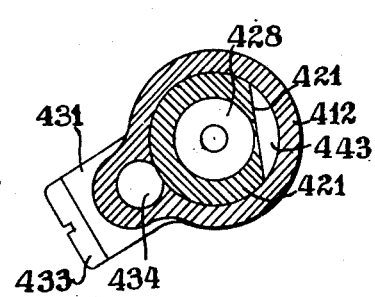
Fig. 33 is a view in section taken substantially on the line 33—33 of Fig. 21 with the valve parts in the closed position of the valve.

The operation of this embodiment of my improved valve is as follows:

In the "off" position (as shown in Figs. 30 and 33) no gas can flow from the passageway 440 into the interior of the casing 412. As the valve plug 421 is turned in a counter-clockwise direction (referring to Figs. 30 to 32 inclusive) the bore 442 eventually becomes aligned with the passageway 440 and a full supply of gas flows from the passageway 440 to bore 442, the pocket 428, the interior of the projection 414, the orifice cap 415, and into the mixing tube 418. In this open position of the valve, the gas is automatically lighted, where flash tube lighting is provided, or the gas may be lighted in any other convenient manner. The valve may be left in such position to secure a maximum flame or may then be turned clockwise to any operative position including those shown in Figs. 31 and 32. In the position of Fig. 32 the flow of gas is cut off from direct flow into the bore 442 but it may pass through the slot or groove 443 into the bore 442 and pocket 428. It may also pass into the passage 434 and thence through the continuation of the passage 434 in the projection 431 through the arcual tapered metering port 436, into the interior of the casing 412 and thence through the projection 414 and the orifice cap 415 into the mixing tube 418. As shown, the position of the valve plug 421 in Fig. 32 corresponds substantially to a position of the valve plug which is between the full "on" position and the position shown in Fig. 28. In the position of Fig. 32 substantially a minimum supply of gas may flow through the arcual tapered metering port 436 into the burner. But this is immaterial for the reason that substantially a full flow of gas goes through the port 442 and pocket 428. Continued rotation of the plug in a clockwise direction moves the valve gradually to positions in which the groove 443 is blocked off and the gas flows only through the arcual tapered metering port 436 into the interior of the casing and thence to the burner. As the plug is moved from the position shown in Fig. 32 toward the position of Fig. 31, the groove 443 moves out of registration with the passageway 440 but before it does so, the groove 441 registers with the passage 434 and during all this part of the movement, gas may flow from the passageway 440 through the groove 441, and thence through the passageway 434. During this movement (from the position of Fig. 32 to the position of Fig. 31) the sleeve 425 is rotated by the fingers 447a and 448a to restrict the port 436. Thus, the operating dial 423 (Fig. 22) is turned first in a counter-clockwise direction to move the valve to the "on" position, at which time the burner is usually automatically lighted. Thence, the operating dial is turned clockwise through an infinitely gradual turn-down so that the gas may be regulated exactly as desired until the simmer position (Fig. 26 and Fig. 27) is reached. In this turn-down operation the position shown in Fig. 28 is reached soon after the position of Fig. 32 is passed (in a clockwise direction). In this position of Fig. 27, the port 436 is uncovered to substantially its maximum extent (for the longitudinal setting of the sleeve 425 at such time). A stop 451 is provided in the casing 413 which cooperates with a stop 452 formed on sleeve 453 to prevent turning the operating dial 423 clockwise farther than the "off" position or counter-clockwise farther than the "on" position.

In order to adjust the valve for different types of gas, the knob 423 is removed, and the rod 424 is screwed further forward (out of) or rearward (into) within the axial bore of the plug 421 to pull the sleeve 425 forward thus increasing the effective size of the port 436, or to allow the spring 427 to move the sleeve rearward decreasing the effective size of the port 436. This adjustment is made at the simmer position of the valve (i. e. that shown in Figs. 26 and 27). Then after adjustment, the knob 423 is replaced. Thereafter rotation of the knob 423 to positions "2," "3," etc., increases the size of the flame gradually as desired. Any subsequent movement of the knob to the simmer position adjusts the flow of gas exactly to produce a simmer flame. Also adjustment of the valve to the other marked positions always adjusts the flow of gas to produce the desired and indicated flame.

By reversal of the machining of the plug 421; by suitable modification of the positions of the stops and the markings on the dial; and by other modifications as desired I can modify the structure so that (1) the operating dial turns in a clockwise direction from "off" to "on," to "7," to "6," to "5," to "4," to "3," to "2" and to "simmer" positions; (2) the operating dial turns clockwise from "off" to "simmer," to "2," to "3," to "4," to "5," to "6," to "7" and to "on" positions; or (3) the operating dial turns counterclockwise from "off" to "on," to "7," to "6," to "5," to "4," to "3," to "2," to "simmer" positions.

*Modified embodiment*

Figure 35:
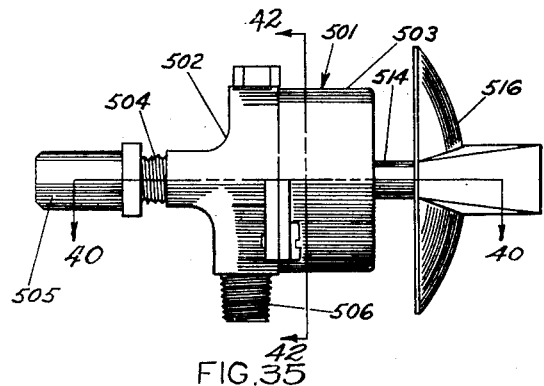
Fig. 35 is a view in side elevation of another valve constructed according to my invention.
Figure 36:
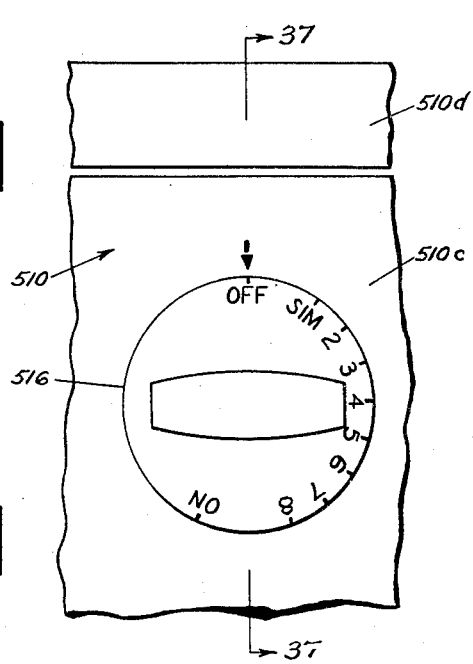
Fig. 36 is a view in front elevation of the valve in Fig. 35 showing also a fragment of a range with which it is associated.
Figure 37:
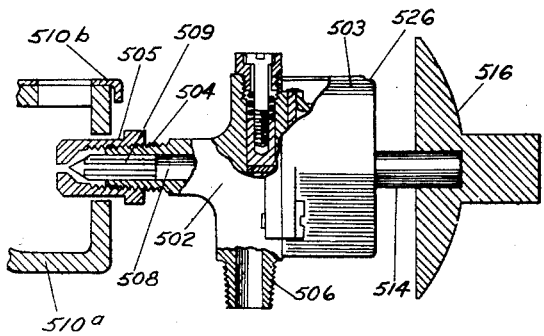
Fig. 37 is a view partially in side elevation but largely in vertical section taken substantially on the line 37—37 of Fig. 36 and showing in connection with the valve a fragment of the range with which it is associated.
Figure 38:
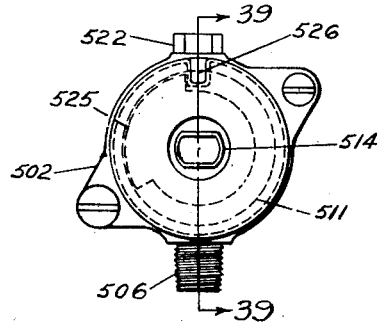
Fig. 38 is a view in front elevation of the valve of Figs. 35 to 37 inclusive, associated portions of the range and the control knob having been removed.
Figure 39:
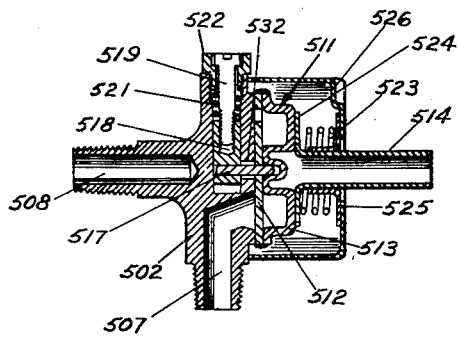
Fig. 39 is a view in vertical section taken substantially on line 39—39 of Fig. 38.
Figure 40:
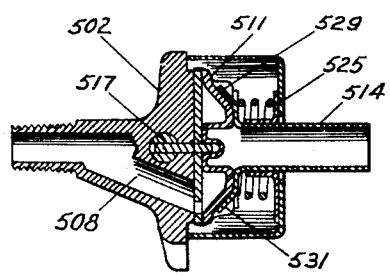
Fig. 40 is a view in horizontal section taken substantially on the line 40—40 of Fig. 35.

Referring now to Figs. 35 to 49 inclusive for a detailed description of an additional embodiment of my invention it may be seen that I have shown a different type of valve. The valve of Figs. 35 to 49 inclusive is a disk type valve. Among the advantages of my disk type valve may be mentioned the fact that the rotor member of the disk valve is shifted in position to obtain the proper adjustment of the "turn down." In a plug type valve the plug itself cannot be shifted and thus requires a separate shiftable member whose position is adjustable. No additional major part is required to make the disk type valve adjustable for gases of different heating values. In Fig. 35, there is shown a gas cock 501 formed of a main body 502 provided with a casing or cover 503. Formed on the rearward end of the main body member 502 is a threaded projection or nozzle 504 onto which there may be screwed (as is shown in Figs. 35 and 37) an orifice cap 505. The main body member 502 is also formed with a downwardly extending threaded boss 506 which is adapted to be threaded to a gas manifold. The orifice cap 505 is adapted to be extended into the end of a burner mixing tube 510a of a range 510 (see Fig. 36). The main body member 502 (as is shown more clearly in Fig. 39) is formed with an inlet bore or port 507 and with an outlet bore or port 508. (See also Fig. 40.) The nozzle 504 is provided with an orifice jet piece 509 which together with the orifice cap 505 adjustably restricts the flow of gas out of the outlet bore 508. The air inlet to the mixing tube 510a may be controlled by an adjustable shutter 510b. The forward face of the main valve member 502 is formed with a flat surface and is the stator of the valve. I provide a disk valve member 511 (see Fig. 39) for cooperation with this flat surface. This disk valve member 511 which is the rotor of the valve is formed of a flat plate 512 and a corrugated member 513 which is seam welded, brazed, soldered or otherwise sealed adjacent to its periphery to the periphery of the flat plate 512 so that the plate 512 and its member 413 form a container or chamber through which gas may at times flow from the inlet port 507 (Fig. 39) to the outlet port 508 (Fig. 40). Secured to the member 511 is a handle member 514 by means of which the disk valve (rotor) member 511 is operated. As is shown in Figs. 35, 36 and 37 the member 514 has secured thereto a knob or dial member 516 by which the handle member 514 and the disk member 511 may be rotated. The disk member 511 is mounted for rotation on a shaft 517 which is shown in Figs. 39 and 40. The shaft 517 is mounted in an adjustable bearing 518 which is held in position by means of an adjustment screw 519, a spring 521 and a cap screw 522. A spring 523 interposed between a flange 524 formed on the handle tube 514 and a stop sleeve 525 maintains the disk (rotor) member 511 in gas tight contact with the surface of the main body (stator) member 502.

As shown in Figs. 36 and 37 the valve is associated with the range 510 which has a main panel 510c and a cooking top frame 510d.

As is shown best in Fig. 39 the casing 503 is formed with an indented portion 526 which forms a stop and limits the rotation of the stop sleeve 525 thus limiting the rotation of the handle member 514 and the disk member 511.

Figure 47:
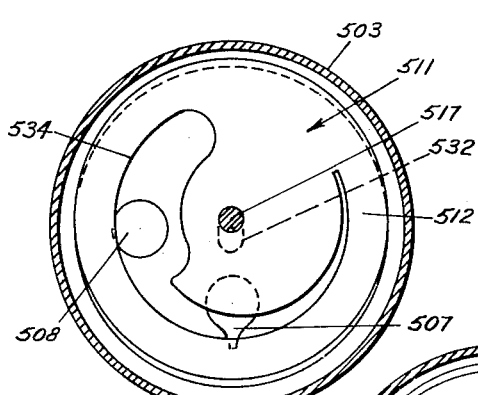
Fig. 47 is a view similar to that of Fig. 46 but showing the position of the valve parts when set for an intermediate position as in Fig. 45 for a gas of relatively low heating value.

As is shown in Fig. 41, the disk valve member 511 or rotor is formed with a relatively large indentation 527 and with a relatively small indentation 528. Projecting fingers 529 and 531 (shown in Fig. 40) fit into the indentations 527 and 528 so that the rotor member 511 is readily rotated by means of the handle member 514. By comparison of the apparent thickness of the tubular portion of handle member 514 in Figs. 39 and 40 it will be noted that the tube or stem of member 514 is not round. By reference to Fig. 38 it may be seen that the stem has a relatively long upper flat surface and a relatively short lower flat surface. This shape of the stem of member 514 cooperates with the stop sleeve 525 so that the sleeve is rotated with the stem of member 514. Figs. 42 to 49 inclusive illustrate various positions of the rotor 511 relative to the body member 502. It will be noticed in Fig. 39 that the shaft 517 is there shown as extending substantially centrally through an opening or slot 532. It is clear that if the shaft 517 is raised by rotation of the screw 519, it may be moved toward the top of the slot 532 and if it is lowered by opposite rotation of the screw 519, the shaft 517 may be lowered to the lower part of the slot 532. In Figs. 42, 43, 44 and 45 the shaft 517 is shown in the same part of the slot 532 as it is shown in Fig. 39. In Figs. 46 and 47, the shaft 517 is shown in the upper part of the slot 532 and in Figs. 48 and 49 it is shown in the lower part of the slot 532. In Fig. 42 the rotor is shown turned to the "off" position in which the inlet opening 507 is wholly covered by the disk 512. In Fig. 43, the rotor member 511 is turned to such position that the rotor disk 512 does not cover the inlet port 507 but on the contrary the slot 534 is so positioned that gas may flow freely from the inlet port 507 into the interior of the rotor member 511 and from the interior of the rotor member 511 may flow freely out through the outlet port 508. The slot 534 is so formed that in other positions intermediate to positions of Fig. 42 and Fig. 43, an exact control of the amount of gas which may flow from the inlet port 507 to the outlet port 508 may be controlled. The shape of the inlet port 507 is such that in the position shown in Fig. 44 only a very small amount of gas may flow into the rotor member 511 from the port 507. As the rotor member 511 is turned counter-clockwise from the position shown in Fig. 44 an increasingly larger amount of gas may flow into the interior of the rotor member from the port 507 and out through the port 508 until in the position shown in Fig. 43 a substantially free flow of gas is possible. The position shown in Fig. 45 is intermediate the position shown in Fig. 44 and the position shown in Fig. 43 and shows a position in which sufficient gas may flow to maintain a fairly substantial flame. The position shown in Fig. 44 is the position in which by using a gas of average heating value, a simmer flame may be maintained.

However, if a gas of lower heating value is to be used the rotor may be shifted by means of the screw 519 to a different position such, for example, as the position shown in Figs. 46 and 47. Fig. 46 shows the simmer setting for such a gas. As may be seen a larger amount of gas may flow into the interior of the rotor 511 through the port 507 as uncovered by the slot 534 than is possible when the rotor is set as is shown in Fig. 44. Also a larger amount of gas may flow when the valve is set in the position shown in Fig. 47 than is possible when the valve is set in the position shown in Fig. 45. Thus adjustment by means of the screw 519 moving the shaft 517 to the upper part of the slot 532 allows the valve to be used for a gas of lower heating value, while at the same time maintaining the possibility of controlling the valve by means of the handle 516 from a "simmer set" position to a full "on" position. Intermediate such positions the operator by operation of the handle may secure an infinite variety of flames.

Figure 48:
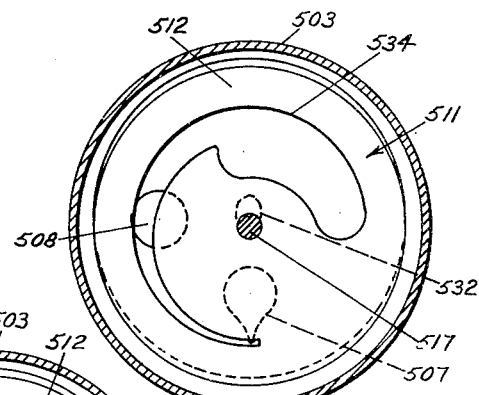
Fig. 48 is a view similar to Figs. 44 and 46 but showing the valve with the parts set for a "simmer" flame with a gas of extremely high heating value.
Figure 49:
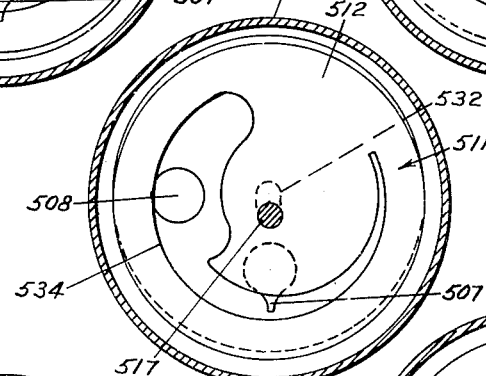
Fig. 49 is a view similar to Figs. 45 and 47 but showing the valve parts as set for an intermediate flame with a gas of relatively high heating value.

Alternatively by moving the shaft 517 to the position shown in Figs. 48 and 49, the valve may be set for operation with a gas of very high heating value, the valve disk being movable from the position shown in Fig. 48 in which a flame for a "simmer" operation is maintained through an almost infinite number of positions, including the position shown in Fig. 49 (in which a medium flame is maintained) to a position in which there is a full flow of gas flowing in through the port 507, the slot 534 and then out through the slot 534 and the port 508.

Figure 50:
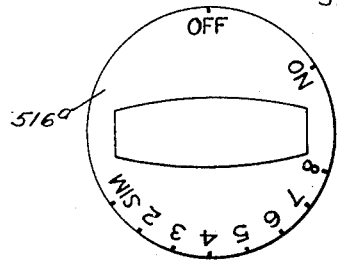
Fig. 50 is a view of another embodiment showing the knob by which the valve may be turned from the "off" position, first to the full "on" position and then through intermediate positions for a gradual decreasing flame from the full "on" flame to a "simmer" flame.
Figure 52:
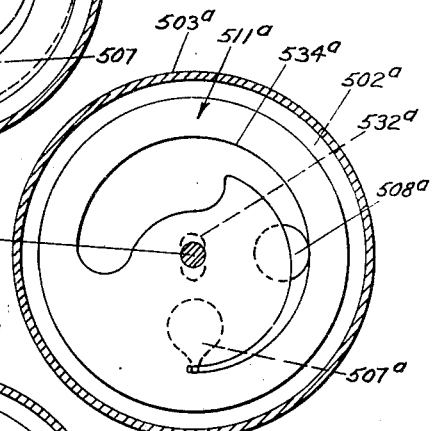
Fig. 52 is a view similar to Fig. 51 but showing the valve parts when set for a gas of medium heating value for a "simmer" flame.
Figure 51:
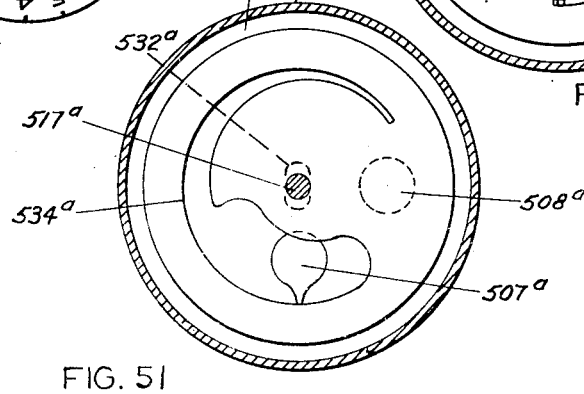
Fig. 51 is a view similar to the views shown in Figs. 42 to 49 inclusive but showing the structure of a valve arranged for operation by a dial such as that which is shown in Fig. 50, the valve being shown in an "off" position.

In Figs. 50, 51 and 52 a modification of the valve disclosed in Figs. 35 to 49 inclusive is shown. Therein the knob 516a may be moved counter-clockwise from the "off" position directly to the "on" position and then the flame may be adjusted to the "simmer" position. In order to accomplish this purpose the position of the outlet port 508a is moved to the opposite side of the casing 502a while the inlet port 507a is maintained in the same position. The slot 534a is reversed in the rotor member 511a. The cover, 503a may be the same and the slot 532a may be similarly formed as may also the shaft 517a.

It is believed that the operation of the valves described above in Figs. 35 to 49 inclusive will be obvious from the above description. With the valve in the position shown in Fig. 42 no gas may flow from the intake manifold through the inlet port 507 into the rotor 511 nor into the outlet port 508. If the valve, however, is turned counter-clockwise to the position shown in Fig. 44 (that is the dial is turned so that the arrow points to the designation "sim") a small amount of gas will flow through the tip of the inlet port 507 into the interior of the rotor 511 and then out through the port 508 to the mixing tube 510a so that a "simmer" flame may be maintained. If the valve is further rotated in a counter-clockwise direction larger flames may be obtained until the valve reaches the position marked "on" (that is the position shown in Fig. 43) when a full flame will be maintained.

If a gas of greater heating value is to be used, the position of the shaft 517 in the slot 532 is adjusted by means of the screw 519 to some other position as, for example, the position shown in Figs. 46 and 47, which is for a gas of relatively low heating value.

Alternatively the shaft 517 may be adjusted to the position shown in Figs. 48 and 49 which is for a gas of relatively high heating value.

For the purpose of adjusting the valve to give the desired flames, the valve is first turned to the full "on" position and the orifice cap 505 is adjusted relative to the jet piece 509 to obtain the proper flow of gas and the air shutter 510b is adjusted to give a clear or proper flame. Then the valve is turned to the minimum flame possible and the position of the shaft 517 is adjusted (if necessary) up or down by the screw 519 in order that the minimum flame may coincide with the simmer set marking on the dial. The flames for the other settings on the dial will be adjusted automatically.

*Modified embodiment*

In Figs. 53 to 57 inclusive, there is disclosed another modification of my invention. Therein, a valve somewhat similar to that disclosed in Figs. 10 to 17 inclusive is shown. The valve as a whole is designated as 661 and includes a casing 662, and a spring cap 663. Formed on the rearward end of the casing 662 is a threaded projection or nozzle 664 onto which there may be screwed an orifice cap 665. The casing 662 is also formed with a downwardly extending threaded boss 666, which is adapted to be threaded into a gas manifold. The orifice cap 665, is adapted to extend into the end of a mixing tube (not shown). Positioned in the casing, 662, is a tapered valve plug 670, having a central recess 671 formed in the rear end thereof and having a forwardly extending stem 672 onto which there is intended to be secured a knob or operating dial. The valve plug 670 is formed with an oblique threaded bore inclined to the axis of the plug. Threaded into this inclined bore is an adjustment screw 674, bearing at its rearward end on a washer 674a which in turn bears upon a sleeve 675 which is positioned in the recess 671. The sleeve 675 surrounds a spring retaining screw 676 which is screwed concentrically into a central bore formed in the plug 670. Surrounding the screw 676 is a spring 677 which bears at its rearward end on the head of the screw 676 and at its forward end on a washer 676b which in turn bears on the inner side of the base of the cup-like sleeve 675. Thus, the sleeve 675 is resiliently held by the spring 677 against the washer 674a which bears against the inner end of the screw 674. Thus, by means of the screw 674, the position of the sleeve 675 may be adjusted longitudinally of the plug 670. The washers 674a and 676b preferably are hardened. They as well as the sleeve 675 should be thoroughly and efficiently lubricated.

Referring now for the instant to Fig. 56, it may be seen that the plug 670 is formed with a slit or groove 678 which extends more than half way around the circumference of the plug. It is also formed with a port or opening 679 by which gas entering by the inlet bore 680 may at times pass into the recess 671. That is to say, when the port or opening 679 is aligned with the inlet bore 680 it is also aligned with the opening 681 in the sleeve 675. Then gas may flow unimpededly through the bore 680, the opening 679, the opening 681, the recess 671 and thus rearwardly through the nozzle 664 to the burner. As is shown in Fig. 56 and in Fig. 53, the plug 670 adjacent to the slit 678 is formed with a reduced portion 696 whereby the diagonal slit 678 is connected to the inlet port 680. It will also be noted by reference to Fig. 57 that the opening 681 has a reduced portion 682. The diagonal slit 678 may be at times registered with the various portions of the reduced portion 682, so as to meter the amount of gas flowing through the valve.

Means are provided to hold the sleeve 675 against rotation. Referring to Figs. 53, 55 and 57 it may be seen that the sleeve 675 is formed with a relatively small projection 683 and with a relatively large projection 684. These projections 683 and 684 fit respectively in corresponding grooves 685 and 686 which are formed in a sleeve 697. The sleeve 697 is secured preferably by a press fit in the forward end of the casing 662.

Within the cover 663 there is provided a stop sleeve 687 having a stop projection which cooperates with a stop indentation 689 formed in the cover 663 to prevent turning the plug farther in one direction (counter-clockwise) than the "off" position or in the opposite direction (clockwise) farther than the "simmer set" position. A spring 690 bearing at its forward end on the sleeve 687 maintains the plug firmly in the casing 662.

The casing 663 is also formed with a cutout portion or opening 691 through which the screw 674 may be adjusted as desired. It is to be noted in this connection that the opening 691 is arranged in such position that the screw 674 is in position for adjustment through the slot 691 when and only when the plug 670 and the sleeve 675 cooperate to allow a minimum flow of gas (i. e. the "simmer set" position). The means for holding the cover 663 to the casing 662; the means for assembly with the range; and the means for adjusting the air in the mixing tube are similar to the embodiments shown in Figs. 10 to 17 inclusive.

*Operation*

The operation of this embodiment is essentially the same as the operation of the embodiment illustrated in Figs. 10 to 17 inclusive. When the valve is in the "off" position, the inlet port 680 does not register with the opening 679 or with the reduced portion 696 and no gas can flow from the inlet port 680. If the plug 670 is turned clockwise from the "off" position, the opening 679 is moved into registration with the inlet port 680 and the gas may be ignited. Further rotation in a clockwise direction brings the reduced portion 696 into registration with the inlet port 680 and thus gas flows to the slit or groove 678. At such times, the slit 678 registers with the wider portion of the opening 682 and a relatively large flow of gas and a relatively high flame is provided. Further clockwise rotation causes registration of the slot with increasingly narrower portions of the reduced portion 682 until a "simmer" flame is provided as the stop projection encounters the stop indentation 689.

Turning the plug 670 counter-clockwise reverses the process and turns the plug to the "off" position and extinguishes the flame. Adjustment for differences in heating values of the gas is accomplished by turning the plug 670 to the "simmer set" position and moving the sleeve inward or outward by means of the screw 674. It will be remembered that the screw 674 may be adjusted through the opening 691 only when the plug is in said "simmer" set position.

It is to be understood that the above described embodiments of my invention are for the purpose of illustration only and various changes may be made therein without departing from the spirit and scope of my invention.

I claim:

1. A valve comprising a non-rotative member, a rotative valve member associated therewith, the non-rotative member being formed with a tapering port and the rotative member being formed with an elongated sloping surface which cooperates with said port to effect a gradual adjustment of the flow of gas through said valve, means for rotating said rotative member, and separate means for adjusting one member longitudinally relative to the other member.

2. A valve comprising a non-rotative member, a rotative valve member associated therewith, the non-rotative member being formed with an arcual tapering port and the rotative member being formed with an elongated sloping surface which cooperates with said port to effect a gradual adjustment of the flow of gas through said valve, means for rotating said rotative member, and separate means for adjusting one member longitudinally relative to the other member.

3. A valve comprising a non-rotative valve member, a rotative valve member associated therewith, one of said members being formed with a tapering port and the other member being formed with a sloping surface which cooperates with the port to effect a gradual adjustment of the flow of gas through said valve, means for rotating said rotative member, and separate means for adjusting one member longitudinally with regard to the other member.

4. A valve comprising a casing formed with an inlet port and an outlet port; a hollow tapered rotatable plug positioned therein, formed with a recess, formed with an opening extending from the circumferential surface thereof to said recess, and formed with a bore inclined obliquely to the axis of the plug; a hollow sleeve open at one end, positioned in the recess, and formed with a port extending through a side wall thereof and registering at times with the opening in the plug; a spring resiliently urging said sleeve longitudinally of said recess; means, comprising a screw threaded through said bore and bearing on said sleeve, for moving said sleeve longitudinally against the urging of said spring; and a rear cover for said casing having a cut-out portion registering with the head of the screw when and only when the valve is in the position in which a very low flame is provided.

5. A valve comprising a casing formed with an inlet opening and an outlet opening, a hollow rotatable plug positioned therein and formed with a concentric recess at its rearward end and with a port extending from the circumferential surface thereof through the side wall to the recess and with a bore extending substantially longitudinally of the plug, a hollow sleeve open at its rearward end positioned in said recess and formed with a port extending through a side wall thereof and registering at times with the port in the plug, a spring resiliently urging said sleeve longitudinally of said recess and means comprising a screw threaded through said longitudinal bore and bearing on said sleeve, for moving said sleeve longitudinally against the urging of said spring.

6. In a gas valve, a hollow casing formed with an inlet opening and an outlet opening, a rotatable member positioned in said casing; a non-rotatable member also positioned in said casing; one of said members being formed with a substantially triangular port and the other member having a sloping surface coacting with said triangular port and moving over said port so that the effective size of the port depends primarily on the rotative position of said rotatable member relative to said non-rotatable member; and a screw effective to move one member linearly so as to increase or decrease the effective size of the gas passage for different rotative positions of the rotatable member.

7. A valve comprising a casing formed with an inlet opening and an outlet opening; a rotatable plug positioned therein, formed with a recess, formed with a port extending from the circumferential surface thereof to said recess, and formed with a bore extending substantially longitudinally of the plug; a hollow sleeve open at one end, positioned in the recess, and formed with a port extending through a side wall thereof and registering at times with the port in the plug; a spring resiliently urging said sleeve longitudinally of said recess; means, comprising a screw threaded through said bore and bearing on said sleeve, for moving said sleeve longitudinally against the urging of said spring; and a cover for said casing having a cut-out portion registering with the head of the screw when and only when the valve is in the position in which a very low flame is provided.

8. A valve comprising a hollow casing formed with an inlet opening and an outlet opening; a hollow non-rotative valve member positioned in said casing and formed with a port extending through a side wall thereof; and a rotative valve member associated with said non-rotative valve member and also formed with a port extending through a side wall thereof, and movable into and out of partial and full registration with the port in said non-rotative valve member, the port of one of said valve members being substantially triangular, the port of the other valve member having a sloping surface which at times registers with, is contiguous to, and cooperates with the first mentioned port to effect a gradual change of the flow of gas through said valve.

9. A valve comprising a hollow casing formed with an inlet opening and an outlet opening; a hollow non-rotative valve member positioned in said casing and formed with a port extending through a side wall thereof; a hollow rotative valve member associated with said non-rotative valve member and also formed with a port extending through a side wall thereof, which port is movable into and out of partial and full registration with the port in said non-rotative valve member, the port of one of said valve members being substantially triangular, and the port of the other valve member having a sloping surface which at times registers and cooperates with the first mentioned port to effect a gradual change of the flow of gas through said valve; and additional means for adjusting said valve members relative to each other along a line substantially parallel to the longitudinal axis of the rotative member.

10. A valve comprising a casing formed with an inlet opening and an outlet opening; a rotatable plug positioned therein, formed with a recess, formed with a port extending from the circumferential surface thereof to said recess, and formed with a bore extending substantially longitudinally of the plug; a hollow sleeve open at one end, positioned in the recess, and formed with a port extending through a side wall thereof and registering at times with the port in the plug; a spring resiliently urging said sleeve longitudinally of said recess; means, comprising a screw threaded through said bore and bearing on said sleeve, for moving said sleeve longitudinally against the urging of said spring; and a cover for said casing having a cut-out portion registering with the head of the screw.

11. A valve comprising a hollow casing formed with an inlet opening and an outlet opening; a hollow non-rotative valve member positioned in said casing and formed with a port extending through a side wall thereof; a hollow rotative valve member associated with said non-rotative valve member and also formed with a port extending through a side wall thereof, which port is movable into and out of partial and full registration with the port in said non-rotative valve member, the port of one of said valve members being tapered, and the port of the other valve member having a sloping surface which at times registers and cooperates with the first mentioned port to effect a gradual change of the flow of gas through said valve; and additional means for adjusting said valve members relative to each other.

12. A valve comprising a casing formed with an inlet opening and an outlet opening, a rotatable plug member positioned therein and formed with a central recess, a hollow open ended sleeve member positioned in said recess, one of said members being formed with a port extending through a wall thereof and the other member being formed with a port extending through a wall thereof and registering at times with a portion of the port of the other member and said ports being connected at times with said inlet port, means for holding said sleeve member against rotation in said casing, means for rotating said recessed plug member in said casing while said sleeve member is held against rotation, and means for moving said sleeve member longitudinally relative to said plug.

13. A valve comprising a casing formed with an inlet opening and an outlet opening, a rotatable plug member positioned therein and formed with a central recess, a hollow open ended sleeve member positioned in said recess and held against rotation in the casing, one of said members being formed with a port extending through a wall thereof and the other member being formed with a port extending through a wall thereof and registering at times with a portion of the port of the other member and said ports being connected at times with said inlet port, means for rotating said plug member relative to said casing, and means for moving said sleeve member longitudinally relative to said plug member and relative to said casing.

14. A valve comprising a casing formed with an inlet opening and an outlet opening, a rotatable plug member positioned therein and formed with a central recess, a hollow open ended sleeve member positioned in said recess and held against rotation in the casing; one of said members being formed with a port extending through a wall thereof and the other member being formed with a port extending through a wall thereof and registering at times with a portion of the port of the other member and said ports being connected at times with said inlet port, means for resiliently holding the sleeve member against longitudinal movement in the plug member; means for holding said sleeve member against rotation in said casing, means for rotating said recessed plug member in said casing while said sleeve member is held against rotation, and means for moving the sleeve member longitudinally in the plug member against the action of the resilient means.

15. A valve comprising a casing having an inlet opening and an outlet opening; a hollow rotatable plug positioned therein and formed with a central recess and with a port extending through a side wall thereof from the circumferential surface to said recess, a hollow open ended sleeve positioned in said recess and formed with a port extending through the side wall thereof and registering at times with the port in said plug, a spring resiliently urging said sleeve longitudinally of said recess, means for holding said sleeve against rotation in said casing, means for rotating said recessed plug in the casing while said sleeve is held against rotation, and means, comprising a screw, for moving said sleeve longitudinally against the urging of said spring.

16. A valve comprising a casing formed with an inlet port and an outlet port, a hollow tapered rotatable plug positioned therein and formed with a recess and an opening extending from the circumferential surface thereof through the side wall to the recess and with a bore inclined obliquely to the axis of the plug, a hollow sleeve open at one end positioned in said recess and formed with a port extending through the side wall thereof and registering at times with the opening in the plug, a spring resiliently urging said sleeve longitudinally of said recess and means, comprising a screw threaded through said bore and bearing on said sleeve, for moving said sleeve longitudinally against the urging of said spring.

17. A valve comprising a hollow casing formed with an inlet opening and an outlet opening; a rotatable member positioned in said casing; a non-rotatable member also positioned in said casing; one of said members being formed with a port having tapered arcual sides and the other member having a tapered surface contacting with said port and moving over said port so that the effective size of the port depends primarily on the rotative position of said rotatable member relative to said non-rotatable member; and a screw connected to one of said members effective to move one of said members linearly so as to increase or decrease the effective size of the port for different rotative positions of the rotatable member.

18. A valve comprising a casing having an inlet and an outlet, a tapered rotatable plug positioned therein and formed with a port connected to said inlet, with a threaded bore and with a recess; a hollow sleeve positioned in said recess and having an open end connected to said outlet and a port cooperating with said plug port; a spring resiliently urging said sleeve longitudinally of said recess; and means comprising a screw threaded through said bore and bearing on said sleeve for moving said sleeve longitudinally against the urging of said spring.

19. A valve having an inlet opening and an outlet opening comprising a rotatable valve member; a second valve member associated therewith, one of said members being formed with a tapering port connected at times to one of said openings through which gas may at times flow and the other member being formed with an elongated sloping surface which is contiguous to and is movable over said tapering port to effect a gradual adjustment of the flow of gas through said valve; means for rotating at least one of said members to open and close said valve to the passage of gas therethrough; and separate means for moving one of said members relative to the other to adjust said sloping surface relative to said tapering port to effect said gradual adjustment of the flow of gas through said valve from said inlet opening to said outlet opening.

20. A valve comprising a stationary casing member having an inlet and an outlet; a rotative plug member positioned in said casing member, formed with a recess and with an opening, said opening and recess communicating separately one with the inlet and the other with the outlet, and being movable to and from a plurality of positions including a simmer position; a hollow cylindrical sleeve member having one end open, having also an opening registering with the opening in the plug, and being positioned for longitudinal movement in said recess; a screw extending through said plug and connected to said sleeve for controlling the longitudinal position thereof relative to the plug; and a spring cap secured to said casing encasing the adjustment screw and formed with a notch through which access may be gained to said screw in the "simmer" position of said plug only.

21. The structure of claim 1 in which the rotative member is a tapered plug member formed with a recess.

22. The structure of claim 1 in which the rotative member is a tapered plug member formed with a recess and the non-rotative member is a hollow sleeve having one end open and the other end closed and is positioned in said recess.

23. The structure of claim 1 in which the non-rotative member is a hollow sleeve having one end open and the other end closed.

24. The structure of claim 1 in which the rotative member is a rotatable disk.

25. The structure of claim 1 in which the non-rotative member is a valve casing formed with an inlet passage and an outlet passage having a flat face to which said passages lead.

26. The structure of claim 1 in which the non-rotative member is a valve casing formed with an inlet passage and an outlet passage having a flat face to which said passages lead and the rotative member is a rotatable disk contacting with said flat face.

27. The structure of claim 11 in which the port of the non-rotative valve member is tapered.

28. The structure of claim 11 in which the rotative valve member is a hollow tapered plug member formed with a port through a side wall thereof having a sloping surface.

ISAAC VERNON BRUMBAUGH.

References Cited in the file of this patent

UNITED STATES PATENTS

| Number | Name | Date |
|---|---|---|
| 1,017,789 | Murphy | Feb. 20, 1912 |
| 1,169,090 | Lucke | Jan. 18, 1916 |

(Other references on following page)

UNITED STATES PATENTS

| Number | Name | Date |
|---|---|---|
| 1,389,276 | Schwer | Aug. 30, 1921 |
| 1,496,584 | McCrink | June 3, 1924 |
| 1,674,743 | Rudolph | June 26, 1928 |
| 1,896,092 | Mangiameli | Feb. 7, 1933 |
| 1,898,952 | Gray | Feb. 21, 1933 |
| 2,062,896 | Martocello | Dec. 1, 1936 |
| 2,140,292 | Jensen | Dec. 13, 1938 |
| 2,162,231 | Schoenberger | June 13, 1939 |
| 2,257,886 | Mueller | Oct. 7, 1941 |
| 2,259,592 | Suvak | Oct. 21, 1941 |
| 2,288,913 | Moecker | July 7, 1942 |
| 2,341,177 | Cope | Feb. 8, 1944 |
| 2,527,733 | Imhoff | Oct. 31, 1950 |

FOREIGN PATENTS

| Number | Country | Date |
|---|---|---|
| 89,784 | Sweden | 1937 |